(12) United States Patent
Satori

(10) Patent No.: US 7,277,233 B2
(45) Date of Patent: Oct. 2, 2007

(54) ZOOM LENS AND IMAGING SYSTEM INCORPORATING IT

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 72 days.

(21) Appl. No.: 11/322,564

(22) Filed: Jan. 3, 2006

(65) Prior Publication Data
US 2006/0152815 A1    Jul. 13, 2006

(30) Foreign Application Priority Data
Jan. 11, 2005  (JP)  ............................. 2005-003991
Jan. 11, 2005  (JP)  ............................. 2005-003992

(51) Int. Cl.
*G02B 15/14* (2006.01)
(52) U.S. Cl. ...................... 359/682; 359/680; 359/689
(58) Field of Classification Search ................ 359/680, 359/382, 389, 691
See application file for complete search history.

(56) References Cited
U.S. PATENT DOCUMENTS

| | | | |
|---|---|---|---|
| 4,572,620 A * | 2/1986 | Kikuchi | ...................... 359/688 |
| 6,597,513 B2 | 7/2003 | Minefuji | |
| 6,710,934 B2 | 3/2004 | Park | |
| 6,781,768 B2 | 8/2004 | Minefuji | |
| 6,809,879 B2 * | 10/2004 | Mihara | ........................ 359/682 |
| 7,023,625 B2 * | 4/2006 | Nanba et al. | ............... 359/689 |
| 7,075,733 B2 * | 7/2006 | Itoh | ........................... 359/689 |
| 7,180,683 B2 * | 2/2007 | Mizuguchi et al. | ......... 359/689 |
| 2003/0197949 A1 | 10/2003 | Eguchi | |
| 2004/0080632 A1 * | 4/2004 | Iwasawa et al. | ......... 348/240.3 |
| 2006/0176575 A1 * | 8/2006 | Katakura | ..................... 359/680 |

FOREIGN PATENT DOCUMENTS

JP    2004-061675    2/2004

\* cited by examiner

*Primary Examiner*—David N. Spector
(74) *Attorney, Agent, or Firm*—Kenyon & Kenyon LLP

(57) ABSTRACT

The invention relates to a small-format yet high-performance two units or three units type zoom lens with a negative unit at the front, which has a zoom ratio of about 3, an angle of view of as wide as 60° at the wide-angle end and high image-formation capability, and is much less susceptible to chromatic blurring, with a compact lens barrel. The zoom lens comprises a first lens unit G1 of negative refracting power and a second lens unit G2 of positive power, wherein zooming is implemented by varying the space between the lens units. The first lens unit G1 is made up of one negative lens $L_{11}$ and one positive lens $L_{12}$, two in all, and satisfies specific conditions with respect to their refractive index and Abbe constant.

24 Claims, 10 Drawing Sheets

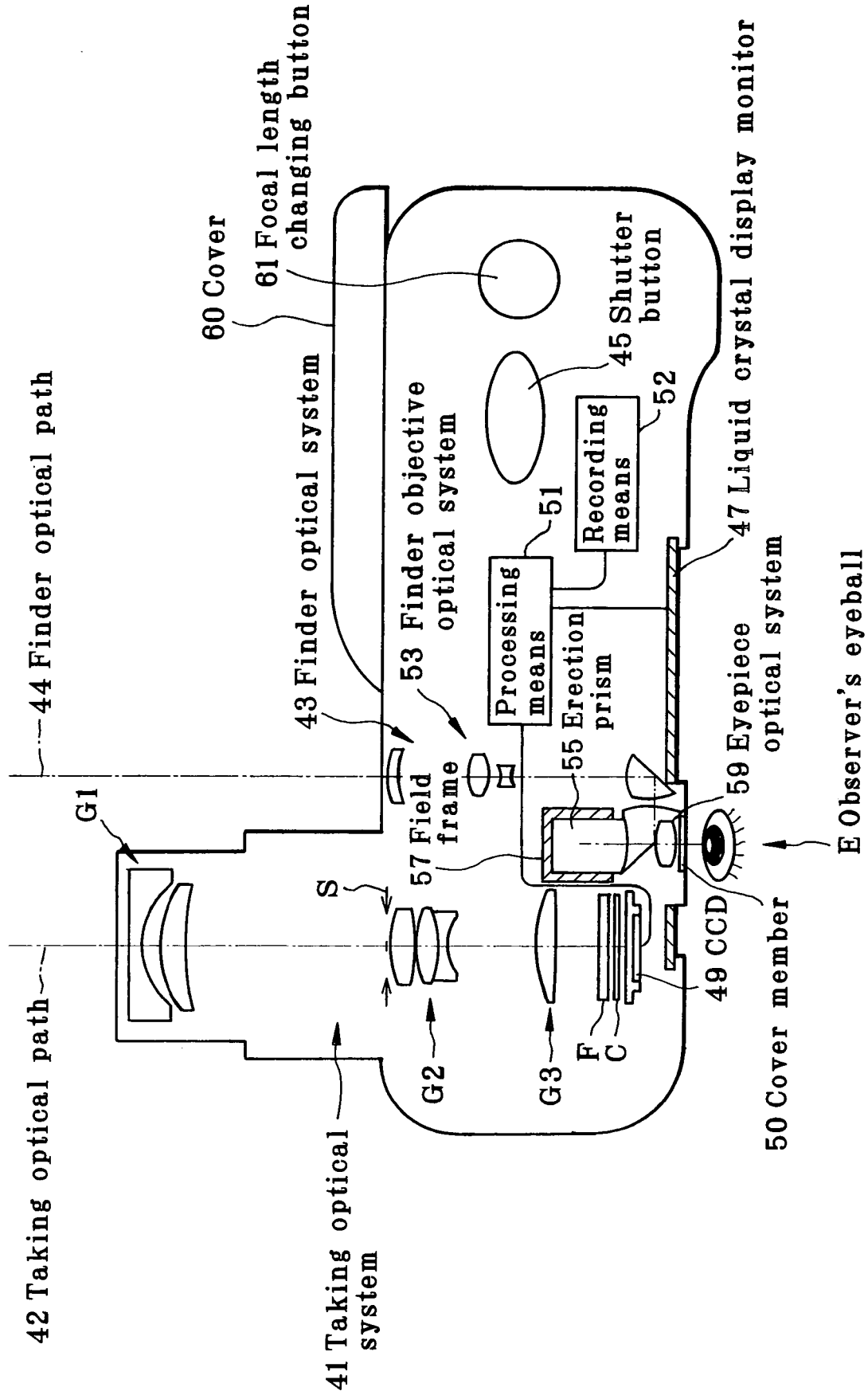

ZOOM LENS AND IMAGING SYSTEM INCORPORATING IT

This application claims benefit of Japanese Application Nos. 2005-3991 and 2005-3992 filed in Japan on Jan. 11, 2005, the contents of which are incorporated by this reference.

BACKGROUND OF THE INVENTION

The present invention relates generally to a zoom lens and an imaging system that incorporates it, and more particularly to a zoom lens well suitable for use with electronic imaging systems such as digital cameras and video cameras, wherein depth size upon received at a collapsible lens mount is reduced by tweaks applied to an optical system portion such as a zoom lens, and an imaging system.

In recent years, digital cameras have attracted attention as next-generation cameras superceding silver-halide 35-mm film cameras. In addition, they are now available in some considerable categories covering every type from the business-application, multifunctional type to the portable low-end type.

In view of the portable, low-end type category in particular, one specific objective of the present invention here is to provide a technology of achieving video cameras and digital cameras that are slimmed down in the depth direction while getting hold of high image quality. The greatest bottleneck to slimming down the depth dimension of a camera is the thickness of an optical system, especially a zoom lens system, from the surface nearest to the object side to the imaging plane. The so-called collapsible lens barrel designed to flip an optical system out from within a camera body upon taking and flip it back in the camera body during taking-along is now in vogue.

Slimming-down and downsizing may be achieved by use of a smaller imaging device. However, its pixel pitch must be smaller so as to maintain the same number of pixels, and poor sensitivity must be compensated for by the optical system. This is also true of the influence of diffraction. Therefore, an optical system having a fast F-number is in need.

Some examples of a prior art relatively compact zoom lens having a fast F-number, a zoom ratio of as high as about 3 and a wide angle of view are shown in patent publications 1, 2, 3, 4 and 5.

In these zoom lenses, however, each of zoom lens-forming lens units has an increased axial thickness, offering a problem that even upon received at a collapsible lens mount, the dimension of the lens barrel in the thickness direction is not fully slimmed down, failing to make an associated camera sufficiently small.

Patent Publication 1
JP(A)2002-277740
Patent Publication 2
JP(A)2003-140041
Patent Publication 3
JP (A) 2004-4765
Patent Publication 4
JP(A)2004-61675
Patent Publication 5
U.S. Pat. No. 6,710,934

SUMMARY OF THE INVENTION

In view of such situations of the prior art as described above, an object of the invention is to provide a zoom lens that is well balanced against its optical performance while its thickness upon received at a collapsible lens mount is reduced.

Another object of the invention is to provide a zoom lens which, albeit having an F-number of as fast as about 2.8, a zoom ratio of as high as about 3, a wide-angle arrangement having an angle of view of about 60° and high image-formation capability, is made up of a reduced number of lenses while the respective lens units forming the optical system have a decreased axial thickness and the size of a lens barrel upon received at a collapsible lens mount is kept compact.

The zoom lens the invention designed to achieve the above objects is generally broken down in two aspects, according to the first of which there is provided a zoom lens, comprising, in order from an object side to an image side thereof, a first lens unit of negative refracting power, and a second lens unit of positive refracting power, with a space between the lens units varied for zooming from a wide-angle end to a telephoto end thereof, wherein:

the first lens unit consists of, in order from an object side thereof, one negative lens $L_{11}$ and one positive lens $L_{12}$, and satisfies the following conditions:

$$1.6800 < n_{d1} < 2.3000 \tag{1}$$

$$1.7000 < n_{d2} < 2.3000 \tag{2}$$

$$30.0 < v_{d2} < 50.0 \tag{3}$$

$$0.0 < n_{d2} - n_{d1} < 0.5 \tag{4}$$

where $v_{d2}$ is the Abbe constant of the positive lens in the first lens unit, $n_{d1}$ is the refractive index of the negative lens in the first lens unit, and $n_{d2}$ is the refracting index of the positive lens in the first lens unit.

The zoom lens according to the second aspect of the invention comprises, in order from an object side to an image side thereof, a first lens unit of negative refracting power, a second lens unit of positive power, and a third lens unit of positive power, with a space between adjacent lenses varied for zooming from a wide-angle end to a telephoto end thereof, wherein:

the first lens unit consists of, in order from an object side thereof, one negative lens and one positive lens, the second lens unit comprises two positive lenses and one negative lens, and the third lens unit consists of one positive lens, and wherein:

the zoom lens satisfies the following condition:

$$(\Sigma d_1 + \Sigma d_2 + \Sigma d_3)/f_t < 0.64 \tag{14}$$

where $\Sigma d_1$ is the axial thickness of the first lens unit from the lens surface nearest to an object side thereof to the lens surface nearest to an image side thereof, $\Sigma d_2$ is the axial thickness of the second lens unit from the lens surface nearest to an object side thereof to the lens surface nearest to an image side thereof, $\Sigma d_3$ is the axial thickness of the third lens unit from the lens surface nearest to an object side thereof to the lens surface nearest to an image side thereof, and $f_t$ is the focal length of the whole system of the zoom lens system at the telephoto end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 11 is a sectional view of the digital camera of FIG. 8, wherein another exemplary zoom lens of the invention is used.

DESCRIPTION OF THE PREFERRED EMBODIMENTS

Figure 1A:
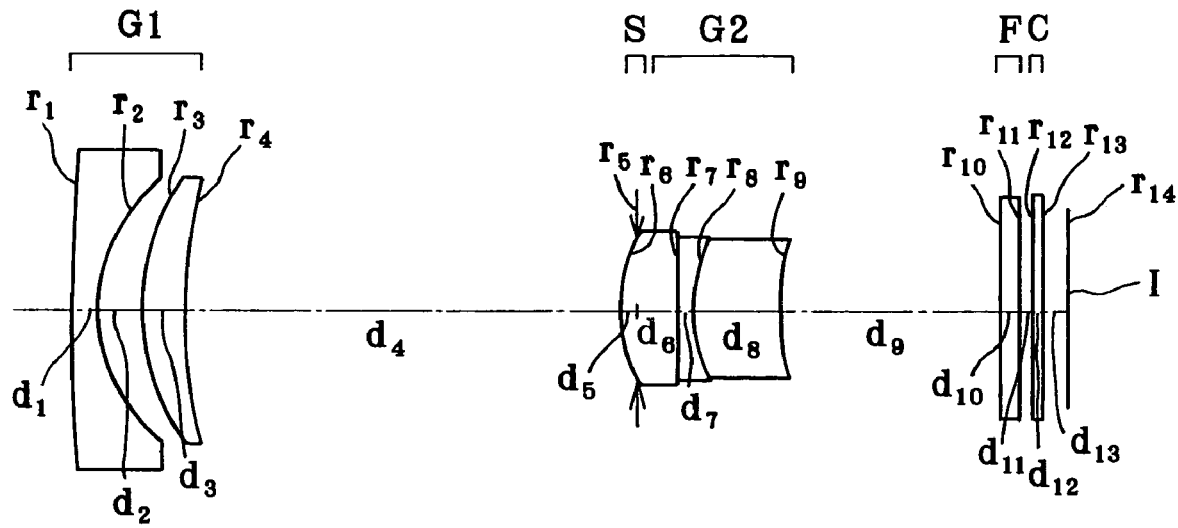
FIGS. 1(a), 1(b) and 1(c) are illustrative in lens arrangement section of Example 1 of the zoom lens according to the invention at the wide-angle end, in an intermediate setting, and at the telephoto end, respectively, upon focusing on an infinite object point.

Possible arrangements of the zoom lens according to the invention will now be explained with reference to first the first aspect, and then the second aspect.

The zoom lens according to the first aspect of the invention comprises, in order from its object side to its image side, a first lens unit of negative refracting power and a second lens unit of positive refracting power with a space between the lens units varied for zooming from its wide-angle end to its telephoto end, wherein:

the first lens unit consists of, in order from an object side thereof, one negative lens $L_{11}$ and one positive lens $L_{12}$, and satisfies the following conditions:

$$1.6800 < n_{d1} < 2.3000 \tag{1}$$

$$1.7000 < n_{d2} < 2.3000 \tag{2}$$

$$30.0 < v_{d2} < 50.0 \tag{3}$$

$$0.0 < n_{d2} - n_{d1} < 0.5 \tag{4}$$

where $v_{d2}$ is the Abbe constant of the positive lens in the first lens unit, $n_{d1}$ is the refractive index of the negative lens in the first lens unit, and $n_{d2}$ is the refracting index of the positive lens in the first lens unit.

The advantage of, and the requirement for, the above zoom lens arrangement according to the invention is now explained.

With that arrangement, the telecentric capability of the zoom lens is so improved that light rays can be efficiently incident on an imaging device such as CCD. To the vantage, the back focus can be kept so long that there can be a good enough space to receive members such as an optical low-pass filter and an infrared cut filter.

To reduce the size of the zoom lens upon received at a collapsible lens mount, the first lens unit must be slimmed down. To this end, the first lens unit must be composed of as few lenses as possible, the axial thickness of each lens must be reduced as much as possible, and the axial space between the lenses must be as narrow as possible. However, this offers a problem in that correction of various aberrations occurring in the first lens unit, especially longitudinal chromatic aberration and chromatic aberration of magnification, becomes difficult. On the other hand, since the first lens unit moves largely upon zooming, the aberrations in the first lens unit must have been well corrected to achieve satisfactory optical performance all over the zoom range. To satisfy such requirements with the zoom lens of the invention, the first lens unit must be composed of only two lenses, negative lens $L_{11}$ and positive lens $L_{12}$, and satisfy the above conditions (1), (2), (3) and (4). It is thus possible to succeed in achievement of effective correction of aberrations in the first lens unit, and getting hold of satisfactory optical performance all over the zoom range. Conditions (1), (2), (3) and (4) are now explained at great length.

When the lower limits of 1.6800 to condition (1) and the lower limit of 1.7000 to condition (2) are not reached, there are considerable aberrations, because the curvature of each lens surface must be increased to allow each lens to have refracting power as desired. In particular, coma and astigmatism remain undercorrected, rendering the off-axis resolving power of the taken image poor. Exceeding the upper limits of 2.3000 to those conditions will make vitreous materials hardly available or mass fabrication worse, resulting in cost rises.

As the lower limit of 30.0 to condition (3) is not reached, it causes a vitreous material to tend to have large anomalous dispersion, and so renders it difficult to correct the secondary spectra of longitudinal chromatic aberration and chromatic aberration of magnification, often resulting in chromatic blurring of taken images. Alternatively, the zoom lens must be composed of a lot more lenses to correct the secondary spectra of chromatic aberrations, resulting in cost increases or a failure in making the zoom lens compact. As the upper limit of 50.0 to condition (3) is exceeded, it causes the chromatic dispersion of the positive lens to become too low to cancel out chromatic aberrations occurring at the negative lens, resulting in incomplete correction of chromatic aberrations.

Off-axis light rays through the negative lens $L_{11}$ in the first lens unit are higher than those through the positive lens $L_{12}$, and so the amount of aberrations occurring at the negative lens $L_{11}$ is more likely to exceed the amount of aberrations canceled out at the positive lens $L_{12}$, and remain undercorrected. In particular, aberrations of off-axis chief rays such as astigmatism, distortion and chromatic aberration of magnification are likely to remain undercorrected. This becomes more noticeable as the taking angle of view becomes wider, offering a problem. To achieve the zoom lens in a wide-angle arrangement form, off-axis aberrations produced at the negative lens $L_{11}$ must be canceled out at the positive lens $L_{12}$; to this end, it is preferable to satisfy condition (4). When the lower limit of 0.0 to condition (4) is not reached, off-axis astigmatism, distortion and chromatic aberration of magnification produced at the negative lens $L_{11}$ can never be corrected at the positive lens $L_{12}$, failing to obtain any good image as far as the periphery of the screen. When the upper limit of 0.5 is exceeded, there is only a limited combination of vitreous materials that can satisfy conditions (1) and (2) at the same time. This is not practical because there is no option but to make use of hardly available or difficult-to-mass-fabricate vitreous material.

In place of one or two or more of conditions (1), (2), (3) and (4), it is more preferable to satisfy the following conditions (1)', (2)', (3)' and (4)'.

$$1.7000 < n_{d1} < 1.9000 \tag{1}'$$

$$1.8000 < n_{d2} < 2.0000 \tag{2}'$$

$$30.5 < \nu_{d2} < 46.0 \tag{3}'$$

$$0.05 < n_{d2} - n_{d1} < 0.45 \tag{4}'$$

Even more preferably, $$1.7200 < n_{d1} < 1.8500 \tag{1}''$$

$$1.8500 < n_{d2} < 1.9500 \tag{2}''$$

$$31.0 < \nu_{d2} < 42.0 \tag{3}''$$

$$0.1 < n_{d2} - n_{d1} < 0.3 \tag{4}''$$

The zoom lens should preferably be operable such that upon zooming from the wide-angle end to the telephoto end, the first lens unit moves in a convex locus toward the image side and the second lens unit moves toward the object side alone, because the total length of the zoom lens can be compact while the inter-exit pupil distance is kept pertinent.

The zoom lens should preferably satisfy the following condition with respect to the vitreous material used:

$$16.0 < \nu_{d1} - \nu_{d2} < 50.0 \tag{5}$$

where $\nu_{d1}$ is the Abbe constant of the negative lens in the first lens unit.

As the lower limit of 16.0 to condition (5) is not reached, it causes cancellation of chromatic aberrations in the first lens unit to tend to become insufficient. When the upper limit of 0.5 is exceeded, there is only a limited combination of vitreous materials that can satisfy conditions (1) and (2) at the same time. This is not practical because there is no option but to make use of hardly available or difficult-to-mass-fabricate vitreous material.

More preferably, $$16.8 < \nu_{d1} - \nu_{d2} < 41.0 \tag{5}'$$

Even more preferably, $$17.6 < \nu_{d1} - \nu_{d2} < 32.0 \tag{5}''$$

For the zoom lens of the invention, it is also preferable to satisfy the following condition:

$$0.10 < \Sigma d_1 / f_t < 0.50 \tag{6}$$

where $\Sigma d_1$ is the axial thickness of the first lens unit from the surface nearest to the object side thereof to the surface nearest to the image side thereof, and $f_t$ is the focal length of the whole zoom lens system at the telephoto end.

As the lower limit of 0.10 to condition (6) is not reached, it fails to get hold of a sufficient edge or axial thickness of the lenses that form the first lens unit, and so render it difficult to process them, leading to cost increases and, hence, a failure in the provision of an inexpensive zoom lens or the processing of the lenses. As the upper limit of 0.5 to condition (6), good correction of aberrations could be implemented without recourse to the arrangement of the invention.

More preferably, $$0.16 < \Sigma d_1 / f_t < 0.38 \tag{6}'$$

Even more preferably, $$0.22 < \Sigma d_1 / f_t < 0.25 \tag{6}''$$

The zoom lens should preferably satisfy the following condition with respect to the focal lengths of the negative lens and the positive lens in the first lens unit:

$$0.25 < |f_{11}/f_{12}| < 0.60 \tag{7}$$

where $f_{11}$ is the focal length of the negative lens in the first lens unit, and $f_{12}$ is the focal length of the positive lens in the first lens unit.

As the upper limit of 0.60 to condition (7) is exceeded, it causes the power of the negative lens to become too weak. As a result, it is difficult to bring the front principal point of the first lens unit out toward the image side; the entrance pupil tends to become deep, often ending up with an increase in the diameter of the front lens. As the lower limit of 0.25 is not reached, it causes the power of the negative lens to become too strong, rendering correction of off-axis astigmatism, distortion and chromatic aberration of magnification difficult.

More preferably, $$0.35 < |f_{11}/f_{12}| < 0.56 \tag{7}'$$

Even more preferably, $$0.43 < |f_{11}/f_{12}| < 0.52 \tag{7}''$$

The first lens unit should preferably satisfy the following condition with respect to the shape of the positive lens $L_{12}$:

$$-0.6 < SF_{12} < -0.1 \tag{8}$$

where $SF_{12}$ is defined as being equal to $(R_{11} - R_{12})/(R_{11} + R_{12})$ where:

$R_{11}$ is the paraxial radius of curvature of the object-side surface of the positive lens in the first lens unit, and $R_{12}$ is the paraxial radius of curvature of the image-side surface of the positive lens in the first lens unit.

Being short of the lower limit of −0.6 to condition (8) causes errors on fabrication to have large influences on the lens surface precision of the positive lens, imposing severer demands on the surface precision. As a result, much cost is incurred for reasons of awkward processing and yield drops. Exceeding the upper limit of −0.1 causes the power of the positive lens to become inadequate, resulting in poor correction of off-axis astigmatism and distortion.

More preferably, $$-0.54 < SF_{12} < -0.23 \tag{8}'$$

Even more preferably, $$-0.48 < SF_{12} < -0.35 \tag{8}''$$

It is here noted that the negative lens $L_{11}$ in the first lens unit should preferably be configured as tightly concave on the image plane side, with an aspheric surface applied to the concave surface on the image plane side, because it ensures effective correction of off-axis astigmatism and distortion.

In the zoom lens of the invention, the second lens unit takes a substantial part of zooming. To get hold of higher optical performance, therefore, it is preferable that aberrations within the second lens unit have been well corrected. In other words, the second lens unit is preferably made up of two positive lenses and one negative lens for the purpose of making correction of various aberrations such as spherical aberration, astigmatism and coma possible.

The use of a cemented doublet is also preferable in the sense that longitudinal chromatic aberration and chromatic aberration of magnification can be effectively corrected.

Moreover, if the second lens unit is composed of a cemented triplet wherein three lenses are cemented together on the optical axis, it is then possible to implement correction of longitudinal chromatic aberration and chromatic aberration of magnification, and achieve reductions in the sensitivity to lens decentration errors in the second lens unit.

The second lens unit is also preferably composed of three lenses, specifically, a positive lens and a cemented doublet consisting of a positive lens and a negative lens in order from its object side. With that arrangement, the front principal point of the second lens unit can be brought out toward the object side so that the amount of movement of the second lens unit during zooming can be reduced. With the cemented doublet located in the second lens unit, it is further possible to correct longitudinal chromatic aberration and chromatic aberration of magnification.

For more effective correction of aberrations, at least two aspheric surfaces are preferably used in the second lens unit.

As the zoom lens is configured as a two units zoom lens comprising, in order from its object side, a first lens unit of negative refracting power and a second lens unit of positive refracting power, it works for size reductions of the zoom lens upon received at a collapsible lens mount.

As the zoom lens is configured as a three units type zoom lens comprising, in order from its object side, a first lens unit of negative refracting power, a second lens unit of positive refracting power and a third lens unit of positive refracting power, it works for the telecentric capability of the zoom lens.

If the zoom lens is configured as a three units type zoom lens comprising, in order from its object side, a first lens unit of negative refracting power, a second lens unit of positive refracting power and a third lens unit of positive refracting power, it also works for size reductions of the zoom lens upon received at a collapsible lens mount as well as ensuring optical performance.

Thus, the zoom lens of the invention is favorable for both telecentric capability and compactness; if that zoom lens is used with an imaging device located on its image side for converting an image formed through it into electric signals into an imaging system, then that imaging system can be diminished in size.

Preferably in the invention, various tweaks should be applied to the optical system for the purpose of ensuring high optical performance, as embodied below.

Example 1, given later, is directed to a zoom lens arrangement comprising two lens units, specifically, in order from its object side, a first lens unit of negative refracting power and a second lens unit of positive refracting power. With that arrangement comprising only two moving units, the mechanism involved can be simplified so that an associated lens barrel can be easily made compact. Here, if the imaging device is designed to be movable, there can then be only one moving lens unit.

When the imaging plane remains fixed all the time, zooming from the wide-angle end to the telephoto end could be implemented such that, as in Example 1, the first lens unit moves in a convex locus toward the image plane side and the second lens unit moves monotonously toward the object side.

As in Example 1, the second lens unit should preferably be composed of two positive lenses and one negative lens, thereby offering a reasonable tradeoff between correction of various aberrations and compactness. In particular, it is preferable that the second lens unit is made up of, in order from its object side, a positive lens, a negative lens and a positive lens, with aspheric surfaces applied to the surfaces located nearest to the object and image sides, because spherical aberration, coma and astigmatism can be effectively corrected. Especially when the second lens unit is made up of a cemented triplet wherein three lenses are cemented together on the optical axis, longitudinal chromatic aberration and chromatic aberration of magnification can be corrected, and the sensitivity to lens decentration errors in the second lens unit can be minimized as well.

Examples 2, 3 and 4, given later, are each directed to a three units type zoom lens arrangement comprising, in order from its object side, a first lens unit of negative refracting power, a second lens unit of positive refracting power and a third lens unit of positive refracting power.

As the zoom lens is designed such that, as in Example 2, 3 or 4, the first lens unit moves in a convex locus toward the image plane side, the second lens unit moves monotonously toward the object side and the third lens unit moves in an amount of movement different from that of the second lens unit, it works more favorably for improving on telecentric capability while an increase in the whole length of the zoom lens is reduced.

In Examples 2, 3 and 4, the second lens unit is composed of three lenses, specifically, in order from its object side, a positive lens and a cemented doublet consisting of a positive lens and a negative lens. This arrangement enables the front principal point of the second lens unit to be brought out on the object side, so that the amount of movement of the second lens unit during zooming can be minimized. Further, the location of the cemented doublet in the second lens unit allows for correction of longitudinal chromatic aberration and chromatic aberration of magnification.

Comprising such a lens arrangement, the second lens unit should preferably satisfy the following condition:

$$-0.90 < f_{21}/f_{23} < -0.15 \qquad (9)$$

where $f_{21}$ is the focal length of the positive lens nearest to the object side of the second lens unit, and $f_{23}$ is the focal length of the cemented doublet in the second lens unit.

Exceeding the upper limit of −0.15 to condition (9) renders correction of astigmatism difficult, although the whole length of the second lens unit may be shortened because their principal points come closer to the object side. As the lower limit of −0.90 is not reached, it causes the principal points of the second lens unit to come closer to the image side, failing to keep the magnification of the second lens unit high. As a result, the first lens unit increases in the amount of movement, and tends to become bulky.

More preferably, $$-0.66 < f_{21}/f_{23} < -0.23 \qquad (9)'$$

Even more preferably, $$-0.42 < f_{21}/f_{23} < -0.32 \qquad (9)'$$

For the cemented doublet in the second lens unit, it is more preferable that the positive lens to be cemented to the negative lens is in a double-convex shape with the cementing surface convex on the image plane side.

To get hold of an edge thickness, it is preferable to use a positive lens of meniscus shape with a cementing surface convex on the object side. However, this is likely to produce field curvature due to errors in cemented doublet thickness on fabrication. In consideration of getting hold of optical performance, that positive lens is preferably of double-convex shape with the cementing surface convex on the image plane side. Specifically, the cemented doublet should preferably satisfy the following condition with respect to the radius of curvature of the cementing surface:

$$1.0 < f_{23}/R_{cem} < 6.0 \tag{10}$$

where $f_{23}$ is the focal length of the cemented doublet in the second lens unit, and $R_{cem}$ is the paraxial radius of curvature the cementing surface of the cemented doublet in the second lens unit.

As the lower limit of 1.0 to condition (10), it renders longitudinal chromatic aberration and chromatic aberration of magnification likely to remain under-corrected. Exceeding the upper limit of 6.0 is not preferable, because the axial thickness of the cemented doublet grows large due to the need of ensuring the edge thickness of the positive lens in the cementing components.

More preferably, $$2.0 < f_{23}/R_{cem} < 5.1 \tag{10}'$$

Even more preferably, $$3.10 < f_{23}/R_{cem} < 4.30 \tag{10}''$$

For the cementing positive lens in the second lens unit, it is preferably to use a vitreous material having a refractive index of 1.75 or greater.

This allows the desired refracting power to be obtained without increasing the curvature of the lens surface (or decreasing the radius of curvature), so that the occurrence of aberrations can be minimized.

For the positive lens in that cemented doublet, it is desirous that the radii of curvature of the front and back surfaces of the lens are equal in terms of absolute value but different in terms of sign.

This improves on lens assembly capability because there is no need of finding which surface is back or front. There is thus no misalignment problem, leading to yield improvements or cost reductions.

It is preferable that aspheric surfaces are applied to both surfaces of the positive lens located in, and nearest to the object side of, the second lens unit; a total to two aspheric surfaces are located in the second lens unit.

As aspheric surfaces are separately used with different lenses, it offers a problem in that when the lenses are subjected to relative decentration during assembly, there is large optical performance deterioration. However, this problem can be eliminated by applying aspheric surfaces to both surfaces of one lens.

On the object-side surface of that positive lens, a light beam to form an image on the optical axis of a CCD or other imaging device travels divergently. If an aspheric surface is applied to that surface, it is effective for correction of spherical aberrations. The aspheric surface at the image-side surface of the positive lens is effective for correction of coma and astigmatism. For lens shape, it is preferable to satisfy the following condition.

$$-5.0 < SF_{21} < -1.0 \tag{11}$$

Here $SF_{21}$ is defined as being equal to $(R_{21}-R_{22})/(R_{21}+R_{22})$ where $R_{21}$ is the paraxial radius of curvature of the object-side surface of the positive lens nearest to the object side of the second lens unit, and $R_{22}$ is the paraxial radius of curvature of the image-side surface of the positive lens nearest to the object side the second lens unit.

As the upper limit of −1.0 to condition (11) is not reached, it renders correction by the aspheric surfaces of coma and astigmatism likely to remain undercorrected, and so makes it difficult to ensure good optical performance all over the zoom range. Being short of the lower limit of −5.0 renders the aspheric surfaces likely to contribute too much to correction of aberrations, and causes optical performance to get worse when there are errors in the aspheric surface on processing. As a result, severer demands will be imposed on the processing precision of the aspheric surfaces, ending up with yield drops, and cost rises.

More preferably, $$-3.7 < SF_{21} < -1.2 \tag{11}'$$

Even more preferably, $$-2.4 < SF_{21} < -1.5 \tag{11}''$$

For the third lens unit, it is preferable to consist of only one positive lens.

In the three units type zoom lens of negative-positive-positive power profile which is one embodiment of the invention, the third lens unit plays a role of refracting mainly off-axis light rays to control the angle of incidences of light rays on the plane of a CCD or other imaging device in such a way as to come within a proper angle range, thereby allowing the light ray to be efficiently incident on the light receptor plane. Only one positive lens suffices to this end.

The third lens unit is also a place where off-axis light rays passing through it pick up height, and so could take a role of correcting off-axis astigmatism and distortion. However, even the use of only one lens suffices for a practical level of correction. Thus, the necessary and sufficient condition here is only the use of one positive lens; that is, the use of two or more lenses is not necessary, because the axial thickness of the lens system becomes larger than required.

As in Example 2, 3 or 4, focusing is preferably implemented by the lens in the third lens unit.

Although focusing may be implemented by the first lens unit, still focusing by the third lens unit is more preferable, because the weight of the lens is so light that loads on a focusing motor can be lessened.

As the focusing is carried out by the third lens unit, it works for making the associated lens barrel compact, because there is no change in the whole length of the zoom lens during focusing, and a driving motor is located within the lens barrel.

The third lens unit is also a place suitable for correction of off-axis astigmatism and distortion. To allow this lens unit to have an active role of correction of aberrations, it is preferable to locate an aspheric surface at the positive lens there. It is then preferable to satisfy the following condition:

$$0.001 < |asp31/f_w| < 0.02 \tag{12}$$

where asp31 is an amount of deviation of the aspheric surface at the effective diameter of the aspheric surface located in the third lens unit, wherein the amount of deviation of the aspheric surface is given by an axial direction distance from the aspheric surface to a spherical surface whose surface vertex is given by that of the aspheric surface and whose radius of curvature is given by the paraxial radius of curvature of the aspheric surface, and $f_w$ is the focal length of the whole system of the zoom lens at the wide-angle end.

As the upper limit of 0.02 to condition (12) is exceeded, it causes the aspheric surface in the third lens unit to contribute too much to correction of astigmatism. Accordingly, even when the astigmatism has already been well corrected at the time of focusing on an infinite object point, there will be a large astigmatism fluctuation with movement of the third lens unit for focusing on a close-range object point, and so off-axis optical performance will tend to get worse. As the lower limit of 0.001 is not reached, it causes off-axis astigmatism and distortion to remain undercorrected.

More preferably, $$0.002 < |asp31/f_w| < 0.013 \qquad (12)'$$

Even more preferably, $$0.003 < |asp31/f_w| < 0.005 \qquad (12)''$$

The positive lens in the third lens unit is preferably configured in such a way as to satisfy the following condition.

$$-8.0 < SF_{31} < 0.0 \qquad (13)$$

Here $SF_{31}$ is defined as being equal to $(R_{31}-R_{32})/(R_{31}+R_{32})$ where $R_{31}$ is the paraxial radius of curvature of the object-side surface of the positive lens in the third lens unit, and $R_{32}$ is the paraxial radius of curvature of the image-side surface of the positive lens in the third lens unit.

When the lower limit of −8.0 to condition (13) is not reached, ghosts and spot flares are likely to arise from reflected light produced between the positive lens in the third lens unit and an optical low-pass filter, a cover glass for CCD, etc. located on an image side with respect thereto, causing optical performance to get much worse. When the upper limit of 0.0 is exceeded, the axial thickness of the positive lens must be increased so as to ensure its edge thickness.

More preferably, $$-5.2 < SF_{31} < -0.6 \qquad (13)'$$

Even more preferably, $$-2.4 < SF_{31} < -1.2 \qquad (13)''$$

Referring to where to locate an aperture stop, it is preferably positioned between the first lens unit and the second lens unit, as shown in Example 1, 2, 3 or 4, given later. If this is done, the entrance pupil can then be located so shallow that the diameter of the front lens can be decreased, with the result that the axial thickness of the lenses can be reduced. This contributes to compactness in the thickness direction. The exit pupil position can also be spaced away from the image-formation position, so that the angle of incidence of light rays on the CCD or other imaging device can be decreased to prevent shading at the corners of the screen. In addition, it is preferable that the aperture stop is movable together with the second lens unit during zooming. If this is done, the mechanism involved cannot only be simplified, but also any dead space is less susceptible to occur upon the lens barrel received at a collapsible lens mount, with a smaller F-number difference between at the wide-angle end and at the telephoto end.

Note that requirements as described above could be applied in various combinations.

Also, note that only the lower limits or the upper limits of the narrower conditions could be applied to the broader conditions.

According to the first aspect of the invention as explained above, it is possible to obtain a zoom lens of the type having a negative lens unit at the front, wherein some tweaks are applied to the construction of the first lens unit apt to grow large thereby reducing the size of the first lens unit, and an imaging system that incorporates that zoom lens.

It is also possible to obtain a small-format yet high-performance two units or three units type zoom lens.

Further, it is possible to obtain a zoom lens that, albeit having a zoom ratio of as high as about 3, an angle of view of as wide as about 60° at the wide-angle end and high image-formation capability, ensures that the each of lens units forming the optical system is kept thin to make an associated lens barrel compact, and has optical performance good enough to prevent chromatic blurring from the screen center to an off-axial screen site.

The zoom lens according to the second aspect of the invention is now explained.

The zoom lens according to the second aspect of the invention comprises, in order from an object side to an image side thereof, a first lens unit of negative refracting power, a second lens unit of positive power, and a third lens unit of positive power, with a space between adjacent lenses varied for zooming from a wide-angle end to a telephoto end thereof, wherein:

the first lens unit consists of, in order from an object side thereof, one negative lens and one positive lens, the second lens unit comprises two positive lenses and one negative lens, and the third lens unit consists of one positive lens, and wherein:

the zoom lens satisfies the following condition:

$$(\Sigma d_1 + \Sigma d_2 + \Sigma d_3)/f_t < 0.64 \qquad (14)$$

where $\Sigma d_1$ is the axial thickness of the first lens unit from the lens surface nearest to an object side thereof to the lens surface nearest to an image side thereof, $\Sigma d_2$ is the axial thickness of the second lens unit from the lens surface nearest to an object side thereof to the lens surface nearest to an image side thereof, $\Sigma d_3$ is the axial thickness of the third lens unit from the lens surface nearest to an object side thereof to the lens surface nearest to an image side thereof, and $f_t$ is the focal length of the whole system of the zoom lens system at the telephoto end.

The advantage of, and the requirement for, the above zoom lens arrangement of the invention is now explained.

Among zoom lenses suitable for use with an electronic imaging device, there is known a three units type zoom lens comprising a negative first lens unit, a positive second lens unit and a positive third lens unit. The invention also relies upon such a three units arrangement. With that arrangement, the telecentric capability of the zoom lens is so improved that light rays can be efficiently incident on an imaging device such as CCD. To the vantage, the back focus can be kept so long that there can be a good enough space to receive members such as an optical low-pass filter and an infrared cut filter.

The first lens unit consists of two lenses, specifically, in order from its object side, one negative lens and one positive lens. One advantage of that first lens unit arrangement is that aberrations occurring within the first lens unit are held back with a minimum number of lenses, so that the whole length of the zoom lens or the length of the lens barrel upon received at a collapsible lens mount does not become longer than required.

The second lens unit arrangement comprises two positive lenses and one negative lens. With that arrangement, spherical aberration, coma and astigmatism produced within the second lens unit can be corrected.

The third lens unit arrangement consists of one positive lens. Even the use of only one positive lens suffices for locating the exit pupil at a proper position and a practical level of aberration correction; this arrangement satisfies the necessary and sufficient condition.

And then, it is preferable to satisfy the following condition:

$$(\Sigma d_1 + \Sigma d_2 + \Sigma d_3)/f_t < 0.64 \quad (14)$$

where $\Sigma d_1$ is the axial thickness of the first lens unit from the lens surface nearest to an object side thereof to the lens surface nearest to an image side thereof, $\Sigma d_2$ is the axial thickness of the second lens unit from the lens surface nearest to an object side thereof to the lens surface nearest to an image side thereof, $\Sigma d_3$ is the axial thickness of the third lens unit from the lens surface nearest to an object side thereof to the lens surface nearest to an image side thereof, and $f_t$ is the focal length of the whole system of the zoom lens system at the telephoto end.

As the upper limit of 0.64 to condition (14) is exceeded, it causes each of the lens units that form the zoom lens to become axially too thick, failing to make the camera sufficiently compact upon the associated lens barrel received at a collapsible lens mount.

The lower limit of 0.30 could be added to condition (14), as described below.

$$0.30 < (\Sigma d_1 + \Sigma d_2 + \Sigma d_3)/f_t < 0.64$$

When the lower limit of 0.30 to this condition is not reached, the axial or edge thickness of each of the lenses that form the zoom lens becomes too small to process, resulting in cost rises or, at worst, any lens processing is hardly possible.

More preferably, $$0.42 < (\Sigma d_1 + \Sigma d_2 + \Sigma d_3)/f_t < 0.60 \quad (14)'$$

Even more preferably, $$0.53 < (\Sigma d_1 + \Sigma d_2 + \Sigma d_3)/f_t < 0.56 \quad (14)''$$

However, as a zoom lens is downsized in such a way as to satisfy condition (14), the power of each of the lenses forming the zoom lens grows strong, offering some problems. For instance, correction of aberrations might become too difficult to meet demands on high optical performance, and the optical performance of the zoom lens might get worse under the influences of errors in lens products on fabrication or assembly. In the examples of the invention given later, various tweaks are applied to the optical system as set forth below, thereby succeeding in keeping high optical performance.

Upon zooming from the wide-angle end to the telephoto end, the zoom lens is preferably designed such that the first lens unit moves in convex locus toward the image side and the second lens unit moves toward only the object side. This ensures that the whole length of the zoom lens can be shortened while a proper exit pupil distance is kept.

More preferably, the third lens unit is designed to move in an amount of movement from that of the third lens unit, because the telecentric capability is easily controllable.

The third lens unit could remain fixed all the time. In that case, the mechanism for moving the lens units can be simplified.

The first lens unit and the second lens unit preferably satisfy the following condition with respect to the refracting power ratio:

$$-1.6 < f_1/f_2 < -1.1 \quad (15)$$

where $f_1$ is the focal length of the first lens unit, and $f_2$ is the focal length of the second lens unit.

When the power of the second lens unit is stronger than defined by the upper limit of −1.1 to condition (15), it is difficult to get hold of telecentric capability, and so shading tends to occur at the corners of a taking screen. When the power of the second lens unit is weaker than defined by the lower limit of −1.6, the zooming action of the second lens unit wanes, resulting in an increase in the amount of movement of the lenses and, hence, an increase in the size of the whole zoom lens system.

More preferably, $$-1.5 < f_1/f_2 < -1.2 \quad (15)'$$

Even more preferably, $$-1.4 < f_1/f_2 < -1.3 \quad (15)''$$

The first lens unit satisfies the following condition with respect to the focal lengths of the negative lens and the positive lens therein.

$$0.25 < |f_{11}/f_{12}| < 0.60 \quad (7)$$

where $f_{11}$ is the focal length of the negative lens in the first lens unit, and $f_{12}$ is the focal length of the positive lens in the first lens unit.

As the upper limit of 0.60 to condition (7) is exceeded, it causes the power of the negative lens to become too weak. As a result, it is difficult to bring the front principal point of the first lens unit out toward the image side; the entrance pupil tends to become deep, often ending up with an increase in the diameter of the front lens. As the lower limit of 0.25 is not reached, it causes the power of the negative lens to become too strong, rendering correction of off-axis astigmatism, distortion and chromatic aberration of magnification difficult.

More preferably, $$0.35 < |f_{11}/f_{12}| < 0.56 \quad (7)'$$

Even more preferably, $$0.43 < |f_{11}/f_{12}| < 0.52 \quad (7)''$$

It is preferable that the negative lens in the first lens unit is in a shape convex on the image plane side with an aspheric surface applied to the concave surface of the lens on the image plane side. As this surface is configured as an aspheric surface, it is effective for correction of off-axis astigmatism and distortion.

The first lens unit should preferably satisfy the following condition with respect to the shape of the positive lens:

$$-0.6 < SF_{12} < -0.1 \quad (8)$$

where $SF_{12}$ is defined as being equal to $(R_{11}-R_{12})/(R_{11}+R_{12})$ where:

$R_{11}$ is the paraxial radius of curvature of the object-side surface of the positive lens in the first lens unit, and $R_{12}$ is the paraxial radius of curvature of the image-side surface of the positive lens in the first lens unit.

Being short of the lower limit of −0.6 to condition (8) causes errors on fabrication to have large influences on the lens surface precision of the positive lens, imposing severer demands on the surface precision. As a result, much cost is incurred for reasons of awkward processing and yield drops. Exceeding the upper limit of −0.1 causes the power of the positive lens to become inadequate, resulting in poor correction of off-axis astigmatism and distortion.

More preferably, $$-0.54 < SF_{12} < -0.23 \qquad (8)'$$

Even more preferably, $$-0.48 < SF_{12} < -0.35 \qquad (8)''$$

The second lens unit is preferably composed of three lenses, specifically, in order from its object side, a positive lens and a cemented doublet consisting of a positive lens and a negative lens. This arrangement enables the front principal point of the second lens unit to be brought out toward the object side, so that the amount of movement of the second lens unit during zooming can be minimized, resulting in compactness of the lens barrel upon received at a collapsible lens mount. Further, the location of the cemented doublet in the second lens unit allows for correction of longitudinal chromatic aberration and chromatic aberration of magnification.

Further, the second lens unit should preferably satisfy the following condition with respect to the power profile:

$$-0.90 < f_{21}/f_{23} < -0.15 \qquad (9)$$

where $f_{21}$ is the focal length of the positive lens nearest to the object side of the second lens unit, and $f_{23}$ is the focal length of the cemented doublet in the second lens unit.

Exceeding the upper limit of −0.15 to condition (9) renders correction of astigmatism difficult, although the whole length of the second lens unit may be shortened because their principal points come closer to the object side. As the lower limit of −0.90 is not reached, it causes the principal points of the second lens unit to come closer to the image side, failing to keep the magnification of the second lens unit high. As a result, the first lens unit or the second lens unit increases in the amount of movement and, with this, the lens barrel tends to become bulky.

More preferably, $$-0.66 < f_{21}/f_{23} < -0.23 \qquad (9)'$$

Even more preferably, $$-0.42 < f_{21}/f_{23} < -0.32 \qquad (9)'$$

For the cemented doublet in the second lens unit, it is more preferable that the positive lens to be cemented to the negative lens is in a double-convex shape with the cementing surface convex on the image plane side. To get hold of an edge thickness, it is preferable to use a positive lens of meniscus shape with a cementing surface convex on the object side. However, this is likely to produce field curvature due to errors in cemented doublet thickness on fabrication. In consideration of getting hold of optical performance, that positive lens is preferably of double-convex shape with the cementing surface convex on the image plane side.

Specifically, the cemented doublet in the second lens unit should preferably satisfy the following condition with respect to the radius of curvature of the cementing surface:

$$1.0 < f_{23}/R_{cem} < 6.0 \qquad (10)$$

where $f_{23}$ is the focal length of the cemented doublet in the second lens unit, and $R_{cem}$ is the paraxial radius of curvature the cementing surface of the cemented doublet in the second lens unit.

As the lower limit of 1.0 to condition (10), it renders longitudinal chromatic aberration and chromatic aberration of magnification likely to remain under-corrected. Exceeding the upper limit of 6.0 is not preferable, because the axial thickness of the cemented doublet grows large due to the need of ensuring the edge thickness of the positive lens in the cementing components.

More preferably, $$2.0 < f_{23}/R_{cem} < 5.1 \qquad (10)'$$

Even more preferably, $$3.10 < f_{23}/R_{cem} < 4.30 \qquad (10)''$$

For the cementing positive lens in the second lens unit, it is preferably to use a vitreous material having a refractive index of 1.75 or greater. This allows the desired refracting power to be obtained without increasing the curvature of the lens surface, so that the occurrence of aberrations can be minimized.

For the positive lens in that cemented doublet, it is desirous that the radii of curvature of the front and back surfaces of the lens are equal in terms of absolute value but different in terms of sign. This improves on lens assembly capability because there is no need of finding which surface is back or front. There is thus no misalignment problem, leading to yield improvements or cost reductions.

The second lens unit is operable to play a main role in zooming. To obtain good optical performance all over the zoom range, various aberrations occurring in the second lens unit should preferably be reduced as much as possible. To this end, it is desirous to locate two or more aspheric surfaces in the second lens unit.

As can be seen from the examples given later, it is particularly preferable to configure the positive lens nearest to the object side as a lens having aspheric surfaces at both surfaces. As aspheric surfaces are separately used with different lenses, it offers a problem in that when the lenses are subjected to relative decentration during assembly, there is a possibility of large optical performance deterioration. However, this problem can be eliminated by applying aspheric surfaces to both surfaces of one lens. On the object-side surface of that positive lens, a light beam to form an image on the optical axis of a CCD or other imaging device travels divergently. If an aspheric surface is applied to that surface, it is effective for correction of spherical aberrations. The aspheric surface at the image-side surface of the positive lens is effective for correction of coma and astigmatism.

The positive lens nearest to the object side of the second lens unit is preferably configured as an aspheric lens that satisfies the following condition.

$$-5.0 < SF_{21} < -1.0 \qquad (11)$$

Here $SF_{21}$ is defined as being equal to $(R_{21}-R_{22})/(R_{21}+R_{22})$ where $R_{21}$ is the paraxial radius of curvature of the object-side surface of the positive lens nearest to the object side of the second lens unit, and $R_{22}$ is the paraxial radius of curvature of the image-side surface of the positive lens nearest to the object side of the second lens unit.

As the upper limit of −1.0 to condition (11) is not reached, it renders correction by the aspheric surfaces of coma and astigmatism likely to remain undercorrected, and so makes it difficult to ensure good optical performance all over the zoom range. Being short of the lower limit of −5.0 renders the aspheric surfaces likely to contribute too much to correction of aberrations, and causes optical performance to get worse when there are errors in the aspheric surface on processing. As a result, severer demands will be imposed on the processing precision of the aspheric surfaces, ending up with yield drops, and cost rises.

More preferably, $$-3.7 < SF_{21} < 1.2 \qquad (11)'$$

Even more preferably, $$-2.4 < SF_{21} < -1.5 \qquad (11)''$$

For the third lens unit, it is preferable to consist of only one positive lens, as can be seen from the examples given later. In the three units type zoom lens of negative-positive-positive power profile which is one embodiment of the invention, the third lens unit plays a role of refracting mainly off-axis light rays to control the angle of incidences of light rays on the plane of a CCD or other imaging device in such a way as to come within a proper angle range, thereby allowing the light rays to be efficiently incident on the light receptor plane. Only one positive lens suffices to this end. The third lens unit is also a place where off-axis light rays passing through it pick up height, and so could take a role of correcting off-axis astigmatism and distortion. However, even the use of only one lens suffices for a practical level of correction. Thus, the necessary and sufficient condition here is only the use of one positive lens; that is, the use of two or more lenses is not necessary, because the axial thickness of the lens system becomes larger than required.

Further, focusing is preferably implemented by the lens in the third lens unit. Although focusing may be implemented by the first lens unit, still focusing by the third lens unit is more preferable, because the weight of the lens is so light that loads on a focusing motor can be lessened. As the focusing is carried out by the third lens unit, it works for making the associated lens barrel compact, because there is no change in the whole length of the zoom lens during focusing, and a driving motor is located within the lens barrel.

The third lens unit is also a place suitable for correction of off-axis astigmatism and distortion. To allow this lens unit to have an active role in correction of aberrations, it is preferable to locate an aspheric surface at the positive lens there. It is then preferable to satisfy the following condition:

$$0.001 < |asp31/f_w| < 0.02 \qquad (12)$$

where asp31 is an amount of deviation of the aspheric surface at the effective diameter of the aspheric surface located in the third lens unit, wherein the amount of deviation of the aspheric surface is given by an axial direction distance from the aspheric surface to a spherical surface whose surface vertex is given by that of the aspheric surface and whose radius of curvature is given by the paraxial radius of curvature of the aspheric surface, and $f_w$ is the focal length of the whole system of the zoom lens at the wide-angle end.

As the upper limit of 0.02 to condition (12) is exceeded, it causes the aspheric surface in the third lens unit to contribute too much to correction of astigmatism. Accordingly, even when the astigmatism has already been well corrected at the time of focusing on an infinite object point, there will be a large astigmatism fluctuation with movement of the third lens unit for focusing on a close-range object point, and so off-axis optical performance will tend to get worse. As the lower limit of 0.001 is not reached, it causes off-axis astigmatism and distortion to remain undercorrected.

More preferably, $$0.002 < |asp31/f_w| < 0.013 \qquad (12)'$$

Even more preferably, $$0.003 < |asp31/f_w| < 0.005 \qquad (12)''$$

The positive lens in the third lens unit is preferably configured in such a way as to satisfy the following condition:

$$-8.0 < SF_{31} < 0.0 \qquad (13)$$

Here $SF_{31}$ is defined as being equal to $(R_{31}-R_{32})/(R_{31}+R_{32})$ where $R_{31}$ is the paraxial radius of curvature of the object-side surface of the positive lens in the third lens unit, and $R_{32}$ is the paraxial radius of curvature of the image-side surface of the positive lens in the third lens unit.

When the lower limit of −8.0 to condition (13) is not reached, ghosts and spot flares are likely to arise from reflected light produced between the positive lens in the third lens unit and an optical low-pass filter, a cover glass for CCD, etc. located on an image side with respect thereto, causing optical performance to get much worse. When the upper limit of 0.0 is exceeded, the axial thickness of the positive lens must be increased so as to ensure its edge thickness.

More preferably, $$-5.2 < SF_{31} < -0.6 \qquad (13)'$$

Even more preferably, $$-2.4 < SF_{31} < -1.2 \qquad (13)''$$

Referring to where to locate an aperture stop, it is preferably positioned between the first lens unit and the second lens unit. If this is done, the entrance pupil can then be located so shallow that the diameter of the front lens can be decreased, with the result that the axial thickness of the lenses can be reduced. This contributes to compactness in the thickness direction. The exit pupil position can also be spaced away from the image-formation position, so that the angle of incidence of light rays on the CCD or other imaging device can be decreased to prevent shading at the corners of the screen. In addition, it is preferable that the aperture stop is movable together with the second lens unit during zooming. If this is done, the mechanism involved cannot only be simplified, but also any dead space is less susceptible to occur upon the lens barrel received at a collapsible lens mount, with a smaller F-number difference between at the wide-angle end and at the telephoto end.

If the zoom lens is configured as a three units type zoom lens comprising, in order from its object side, a first lens unit of negative refracting power, a second lens unit of positive refracting power and a third lens unit of positive refracting power, it also works for size reductions of the zoom lens upon received at a collapsible lens mount as well as ensuring optical performance.

Further, the zoom lens of the invention is favorable for both telecentric capability and compactness; if that zoom lens is used with an imaging device located on its image side for converting an image formed through it into electric signals into an imaging system, then that imaging system can be downsized.

In any one of the zoom lenses of the invention or the imaging system of the invention, the first lens unit preferably satisfies the following conditions (1) and (2):

$$1.6800 < n_{d1} < 2.3000 \tag{1}$$

$$1.7000 < n_{d2} < 2.3000 \tag{2}$$

where $n_{d1}$ is the refractive index of the negative lens in the first lens unit, and $n_{d2}$ is the refracting index of the positive lens in the first lens unit.

It is more preferable to satisfy any one of the following conditions (3), (4), (5) and (6):

$$30.0 < v_{d2} < 50.0 \tag{3}$$

$$0.0 < n_{d2} - n_{d1} < 0.5 \tag{4}$$

$$16.0 < v_{d1} - v_{d2} < 50.0 \tag{5}$$

$$0.10 < \Sigma d_1 / f_t < 0.50 \tag{6}$$

where $v_{d2}$ is the Abbe constant of the positive lens in the first lens unit, $v_{d1}$ is the Abbe constant of the negative lens in the first lens unit, $n_{d1}$ is the refractive index of the negative lens in the first lens unit, $n_{d2}$ is the refracting index of the positive lens in the first lens unit, $\Sigma d_1$ is the axial thickness of the first lens unit from the surface nearest to the object side thereof to the surface nearest to the image side thereof, and $f_t$ is the focal length of the whole system of the zoom lens at the telephoto end.

Conditions (1) and (2) are the requirements preferable for achieving correction of aberrations in the first lens unit and ensuring good optical performance all over the zoom range.

Conditions (1) and (2) are now explained.

To reduce the size of the zoom lens upon received at a collapsible lens mount, the first lens unit must be slimmed down. To this end, the first lens unit must be composed of as few lenses as possible, the axial thickness of each lens must be reduced as much as possible, and the axial space between the lenses must be as narrow as possible. However, this offers a problem in that correction of various aberrations occurring in the first lens unit, especially longitudinal chromatic aberration and chromatic aberration of magnification, becomes difficult.

Therefore, when the first lens unit is made up of only two lenses, specifically, a negative lens and a positive lens, it is preferable for two such lenses to satisfy conditions (1) and (2) at the same time. When the lower limit of 1.6800 to condition (1) and the lower limit of 1.7000 to condition (2) is not reached, there are considerable aberrations, because the curvature of each lens surface must be increased to allow each lens to have refracting power as desired. In particular, coma and astigmatism remain undercorrected, rendering the off-axis resolving power of the taken image poor. Exceeding the upper limit of 2.3000 to those conditions will make vitreous materials hardly available or mass fabrication worse, resulting in cost increases.

As the lower limit of 30.0 to condition (3) is not reached, it causes a vitreous material to tend to have large anomalous dispersion, and so renders it difficult to correct the secondary spectra of longitudinal chromatic aberration and chromatic aberration of magnification, often resulting in chromatic blurring of taken images. Alternatively, the zoom lens must be composed of a lot more lenses to correct the secondary spectra of chromatic aberrations, resulting in cost increases or a failure in making the zoom lens compact. As the upper limit of 50.0 to condition (3) is exceeded, it causes the chromatic dispersion of the positive lens to become too low to cancel out chromatic aberrations occurring at the negative lens, resulting in incomplete correction of chromatic aberrations.

Off-axis light rays through the negative lens $L_{11}$ in the first lens unit are higher than those through the positive lens $L_{12}$, and so the amount of aberrations occurring at the negative lens $L_{11}$ is more likely to exceed the amount of aberrations canceled out at the positive lens $L_{12}$, and remain undercorrected. In particular, aberrations of off-axis chief rays such as astigmatism, distortion and chromatic aberration of magnification are likely to remain undercorrected. This becomes more noticeable as the taking angle of view becomes wide, offering a problem. To achieve the zoom lens in a wide-angle arrangement form, off-axis aberrations produced at the negative lens $L_{11}$ must be canceled out at the positive lens $L_{12}$; to this end, it is preferable to satisfy condition (4). When the lower limit of 0.0 to condition (4) is not reached, off-axis astigmatism, distortion and chromatic aberration of magnification produced at the negative lens $L_{11}$ can never be corrected at the positive lens $L_{12}$, failing to obtain any good image as far as the periphery of the screen. When the upper limit of 0.5 is exceeded, there is only a limited combination of vitreous materials that can satisfy conditions (1) and (2) at the same time. This is not practical because there is no option but to make use of hardly available or difficult-to-mass-fabricate vitreous material.

In place of one or two or more of conditions (1), (2), (3) and (4), it is more preferable to satisfy the following conditions (1)', (2)', (3)' and (4)'.

$$1.7000 < n_{d1} < 1.9000 \tag{1)'}$$

$$1.8000 < n_{d2} < 2.0000 \tag{2)'}$$

$$30.5 < v_{d2} < 46.0 \tag{3)'}$$

$$0.05 < n_{d2} - n_{d1} < 0.45 \tag{4)'}$$

Even more preferably, $$1.7200 < n_{d1} < 1.8500 \tag{1)''}$$

$$1.8500 < n_{d2} < 1.9500 \tag{2)''}$$

$$31.0 < v_{d2} < 42.0 \tag{3)''}$$

$$0.1 < n_{d2} - n_{d1} < 0.3 \tag{4)''}$$

The zoom lens should preferably be operable such that upon zooming from the wide-angle end to the telephoto end, the first lens unit moves in a convex locus toward the image side and the second lens unit moves toward the object side alone, because the total length of the zoom lens can be compact while the inter-exit pupil distance is kept pertinent.

The zoom lens should preferably satisfy the following condition with respect to the vitreous material used:

$$16.0 < v_{d1} - v_{d2} < 50.0 \tag{5}$$

where $v_{d1}$ is the Abbe constant of the negative lens in the first lens unit.

As the lower limit of 16.0 to condition (5) is not reached, it causes cancellation of chromatic aberrations in the first lens unit to tend to become insufficient. When the upper limit of 0.5 is exceeded, there is only a limited combination of vitreous materials that can satisfy conditions (1) and (2) at the same time. This is not practical because there is no option but to make use of hardly available or difficult-to-mass-fabricate vitreous material.

More preferably, $$16.8 < v_{d1} - v_{d2} < 41.0 \quad (5)'$$

Even more preferably, $$17.6 < v_{d1} - v_{d2} < 32.0 \quad (5)''$$

For the zoom lens of the invention, it is also preferable to satisfy the following condition:

$$0.10 < \Sigma d_1/f_t < 0.50 \quad (6)$$

where $\Sigma d_1$ is the axial thickness of the first lens unit from the surface nearest to the object side thereof to the surface nearest to the image side thereof, and $f_t$ is the focal length of the whole zoom lens system at the telephoto end.

As the lower limit of 0.10 to condition (6) is not reached, it fails to get hold of a sufficient edge or axial thickness of the lenses that form the first lens unit and so render it difficult to process them, leading to cost increases and, hence, a failure in the provision of an inexpensive zoom lens or the processing of the lenses. As the upper limit of 0.5 to condition (6), good correction of aberrations could be implemented without recourse to the arrangement of the invention.

More preferably, $$0.16 < \Sigma d_1/f_t < 0.38 \quad (6)'$$

Even more preferably, $$0.22 < \Sigma d_1/f_t < 0.25 \quad (6)''$$

Note that the requirements mentioned above could be applied in various combinations.

Also, note that only the lower limits or the upper limits of the narrower conditions could be applied to the broader conditions.

According to the second aspect of the invention as described above, it is possible to obtain a zoom lens that is well balanced against optical performance while its thickness upon received at a collapsible lens mount is kept thin.

Further, it is possible to obtain a zoom lens that, albeit having an F-number of as bright as about 2.8, a zoom ratio of as high as about 3, an angle of view of as wide as about 60° at the wide-angle end and high image-formation capability, ensures that it is composed of a reduced number of lenses, each of lens units forming the optical system is kept axially thin to make an associated lens barrel compact upon received at a collapsible lens mount.

Figure 1B:
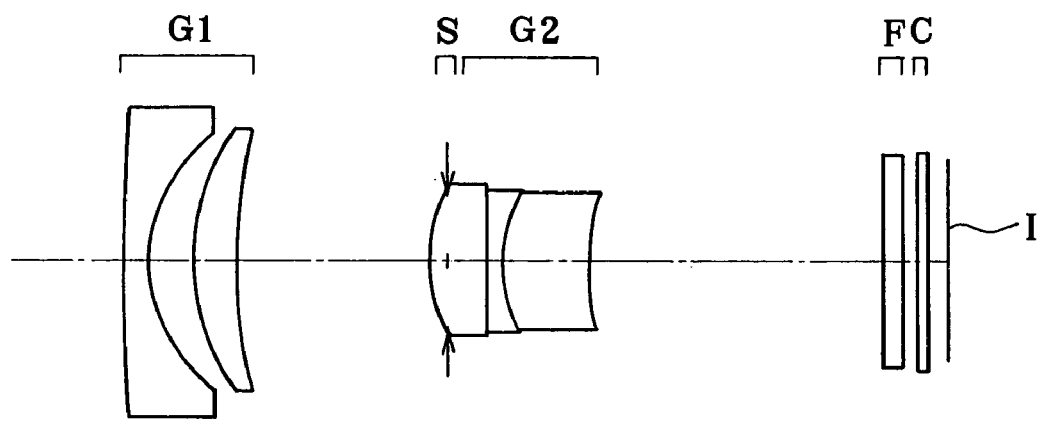
Figure 1C:
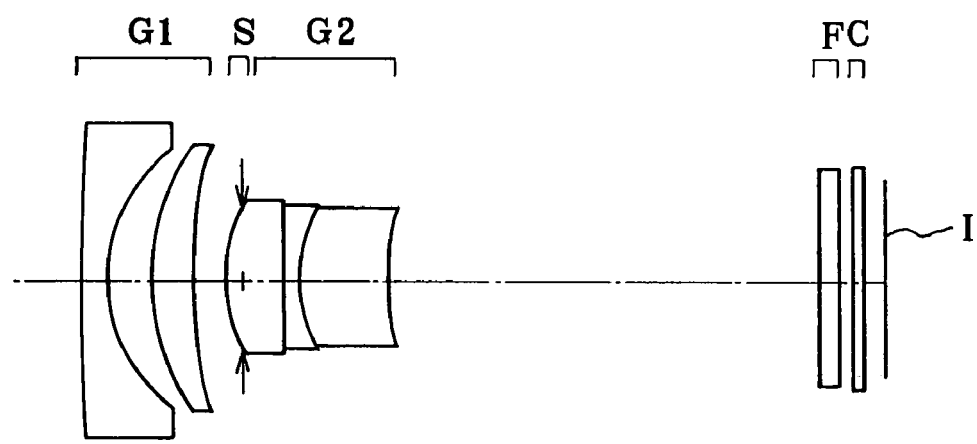
Figure 2A:
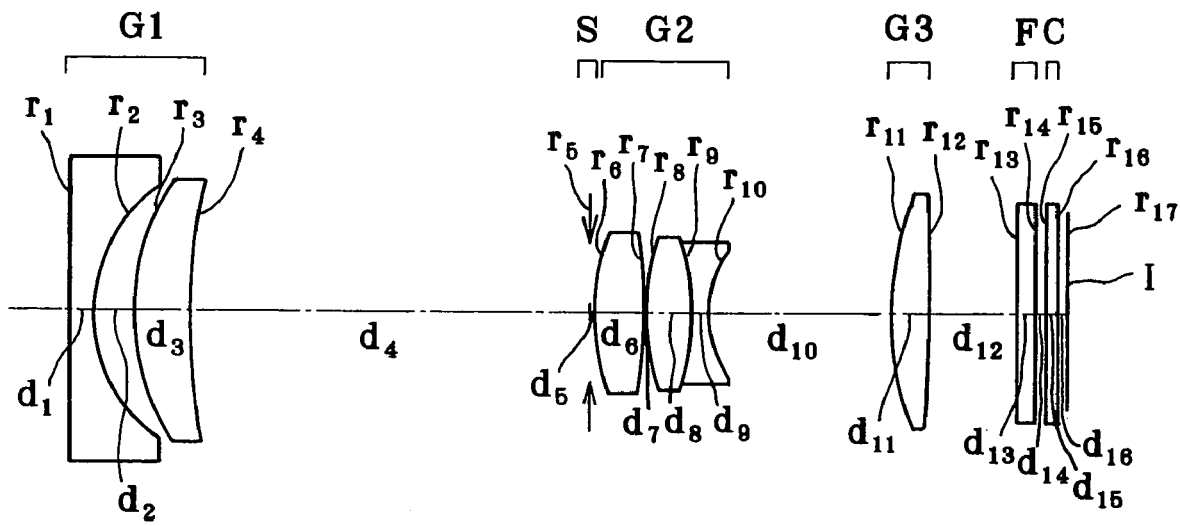
FIGS. 2(a), 2(b) and 2(c) are illustrative, as in FIGS. 1(a), 1(b) and 1(c), of Example 2 of the zoom lens according to the invention.
Figure 2B:
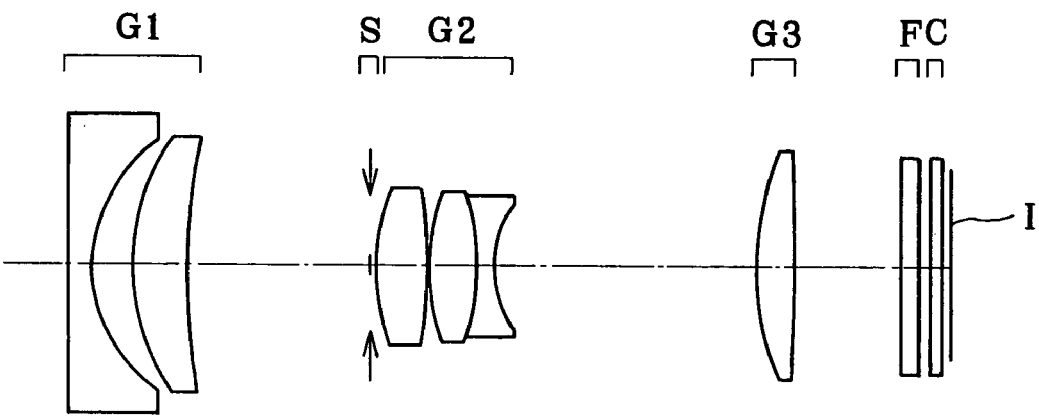
Figure 2C:
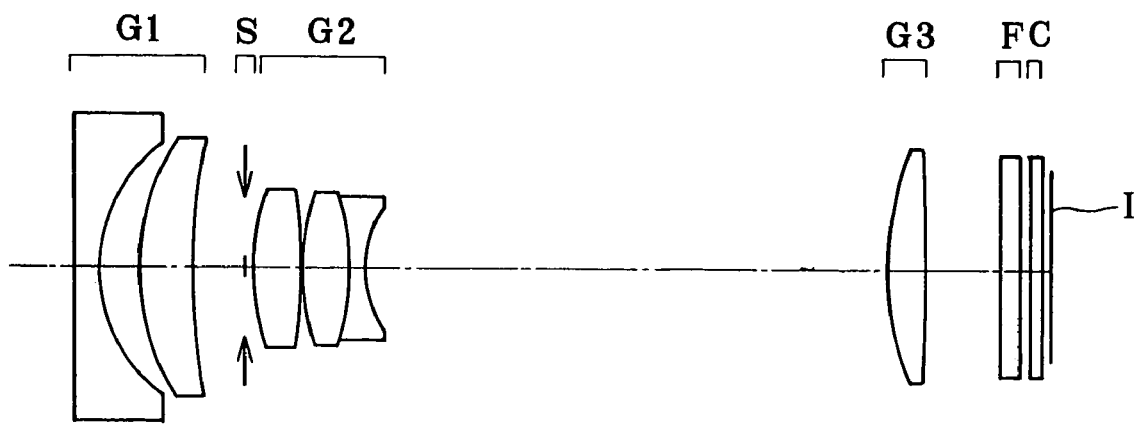
Figure 3A:
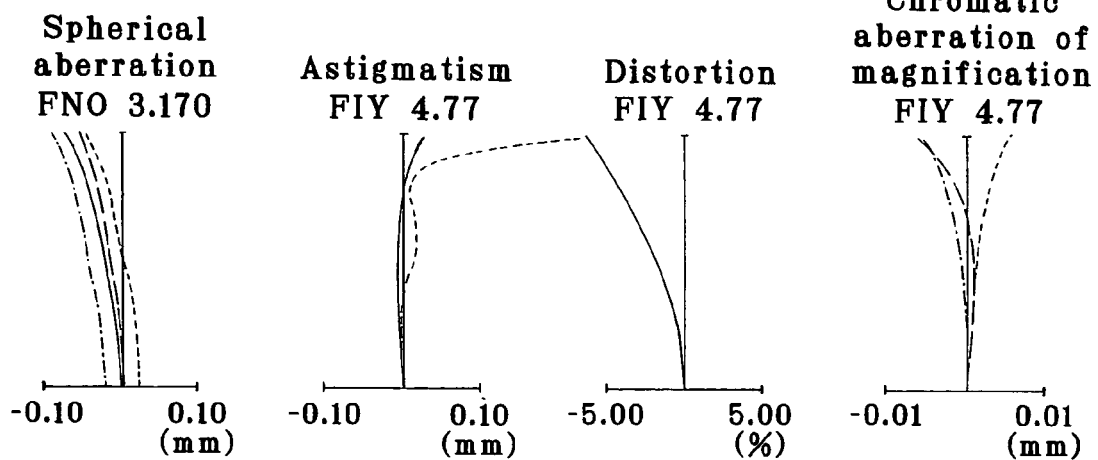
FIGS. 3(a), 3(b) and 3(c) are aberration diagrams for Example 1 upon focusing on an infinite object point.
Figure 3B:
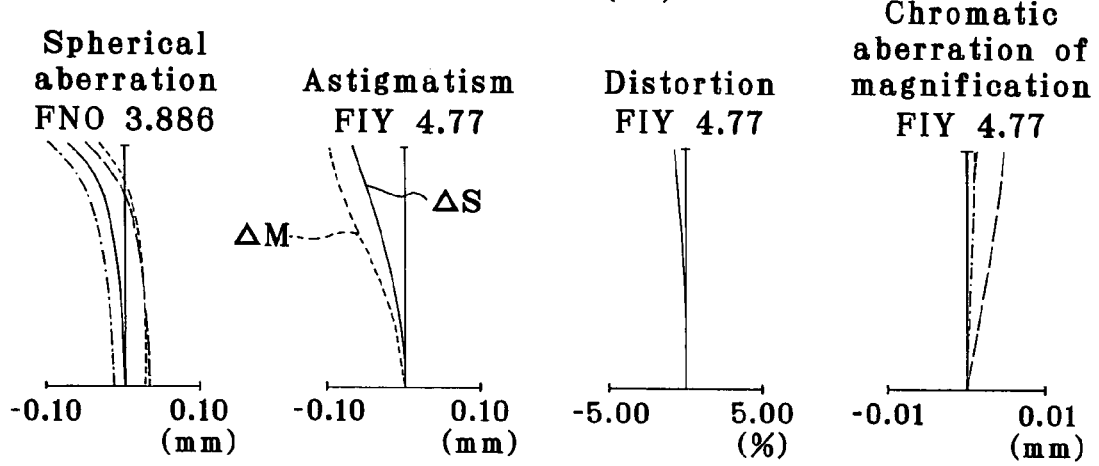
Figure 3C:
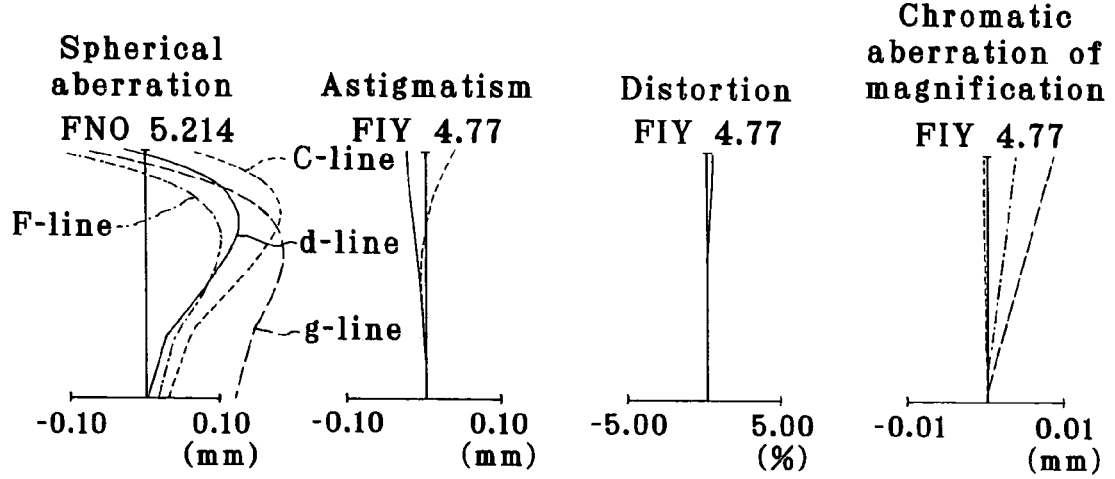
Figure 4A:
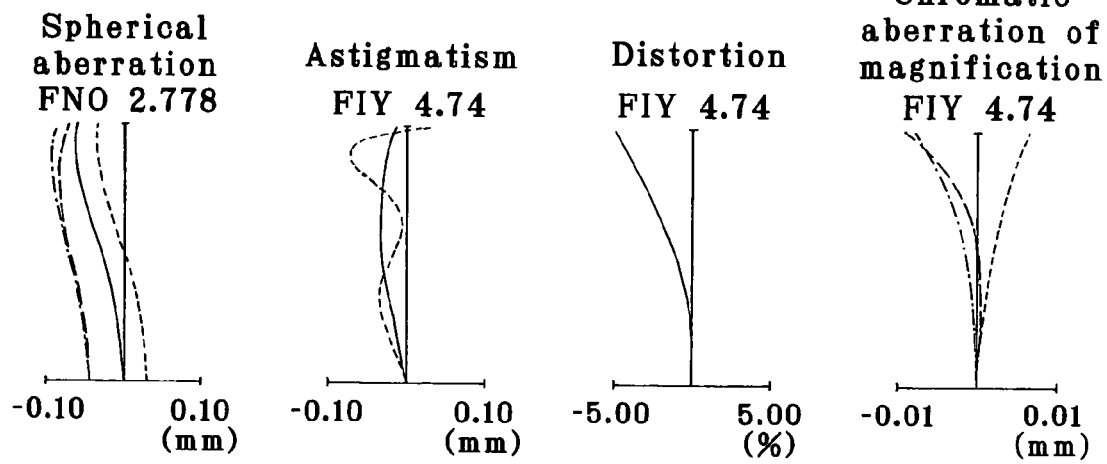
FIGS. 4(a), 4(b) and 4(c) are aberration diagrams for Example 2 upon focusing on an infinite object point.
Figure 4B:
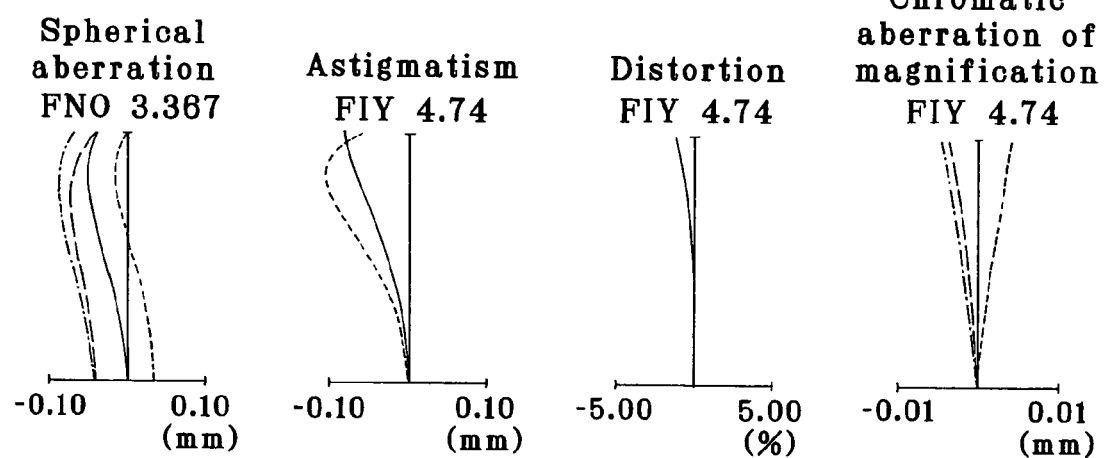
Figure 4C:
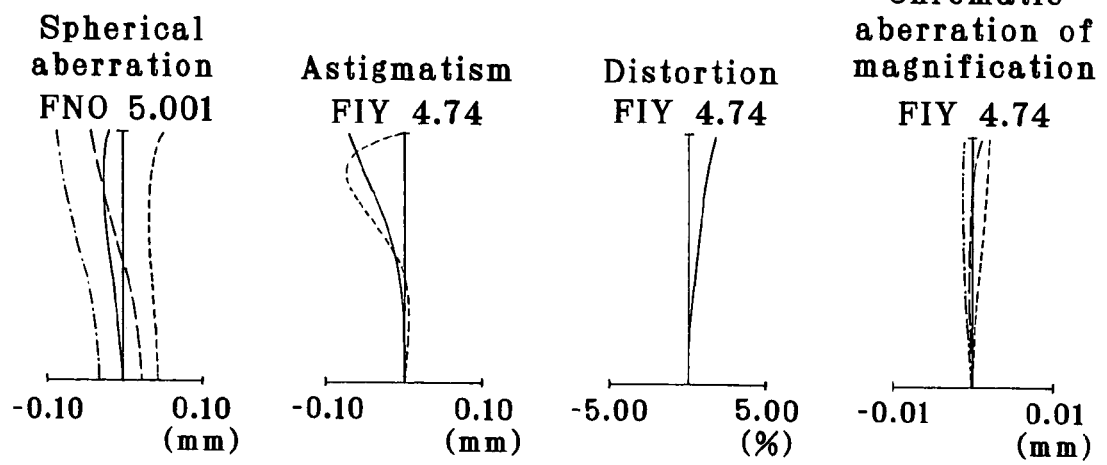
Figure 5A:
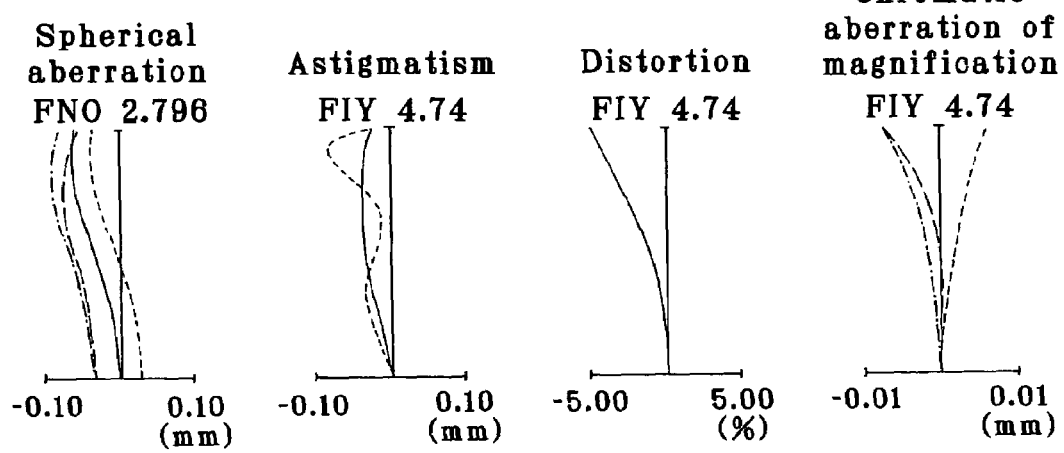
FIGS. 5(a), 5(b) and 5(c) are aberration diagrams for Example 3 upon focusing on an infinite object point.
Figure 5B:
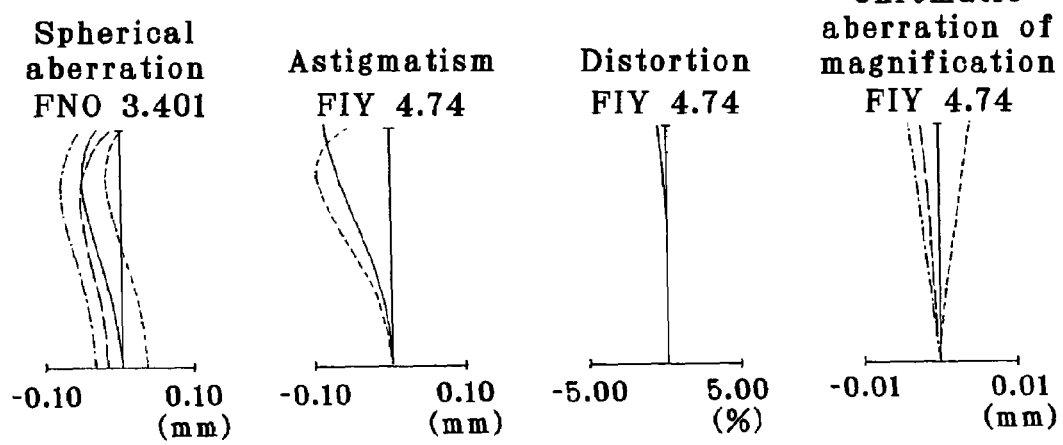
Figure 5C:
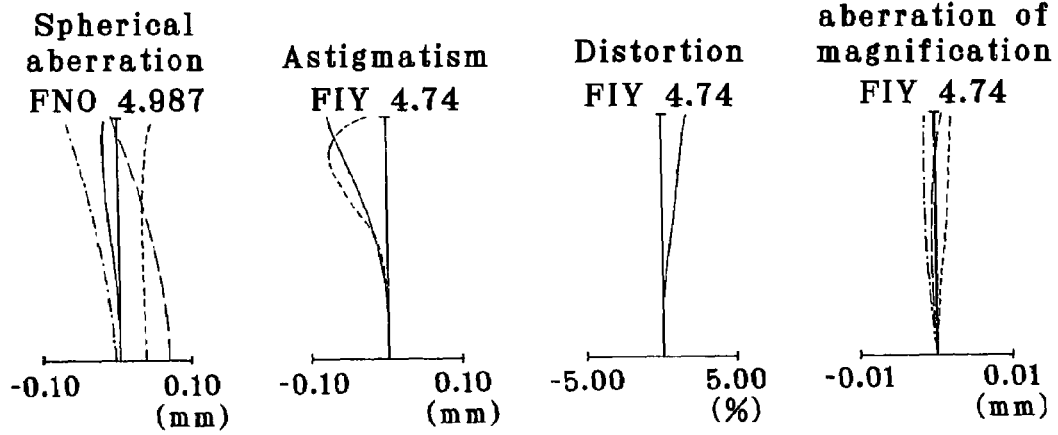
Figure 6A:
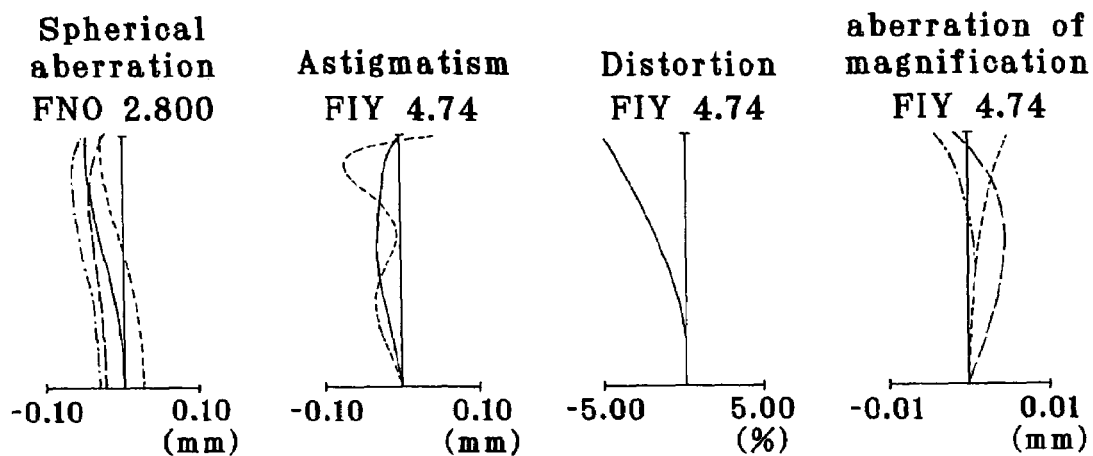
FIGS. 6(a), 6(b) and 6(c) are aberration diagrams for Example 4 upon focusing on an infinite object point.
Figure 6B:
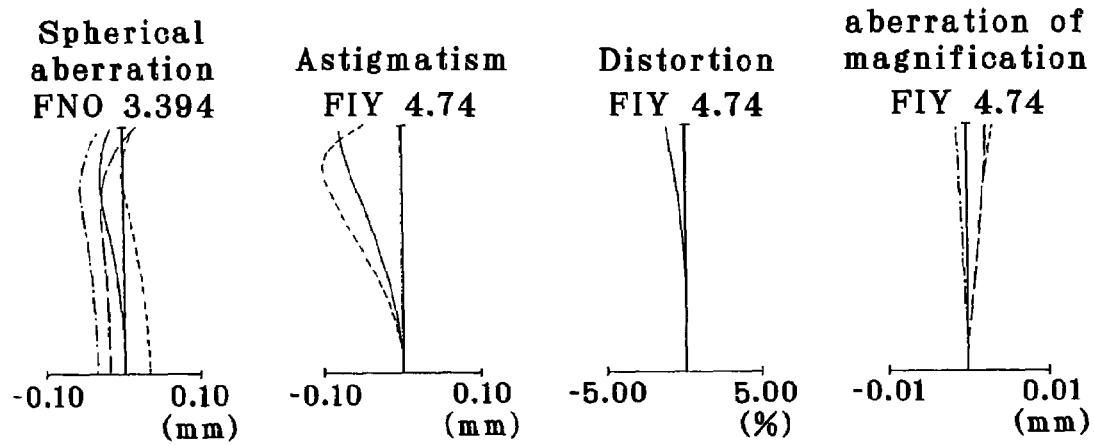
Figure 6C:
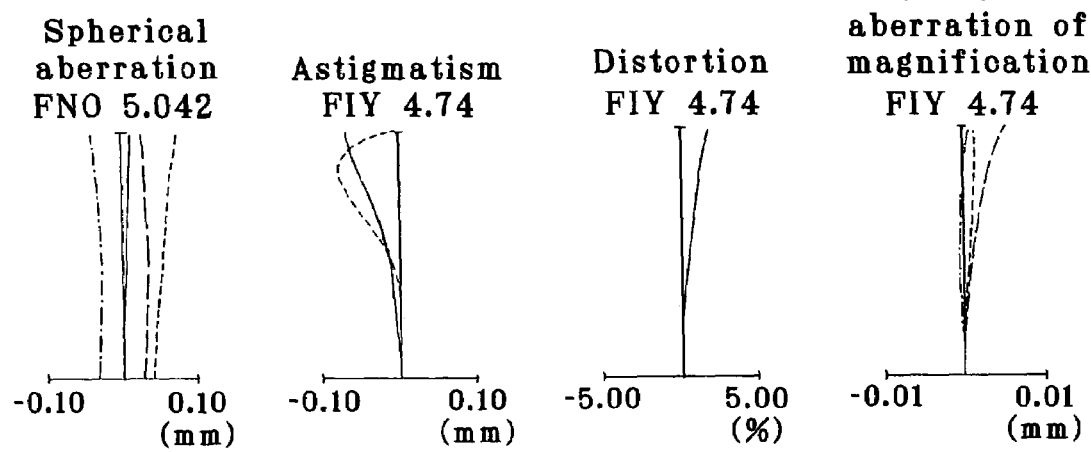
Figure 7A:
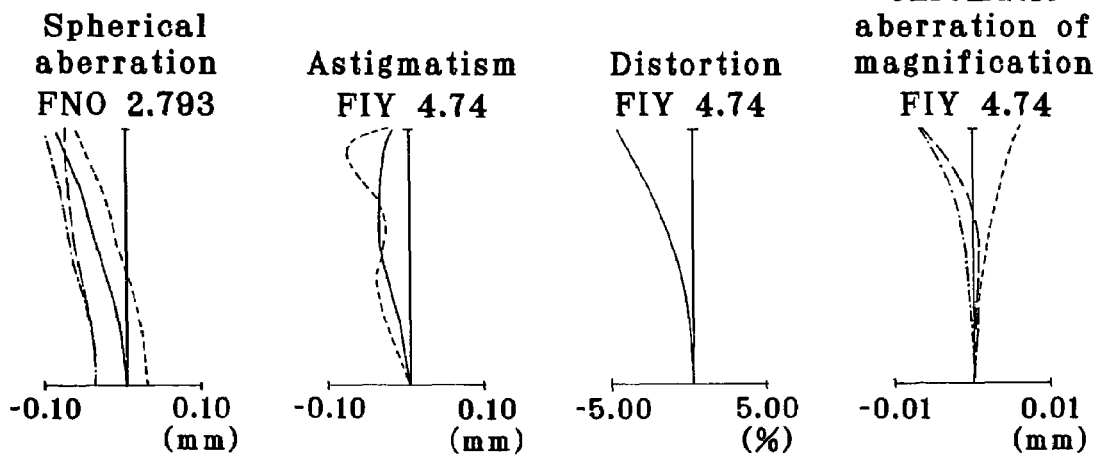
FIGS. 7(a), 7(b) and 7(c) are aberration diagrams for Example 5 upon focusing on an infinite object point.
Figure 7B:
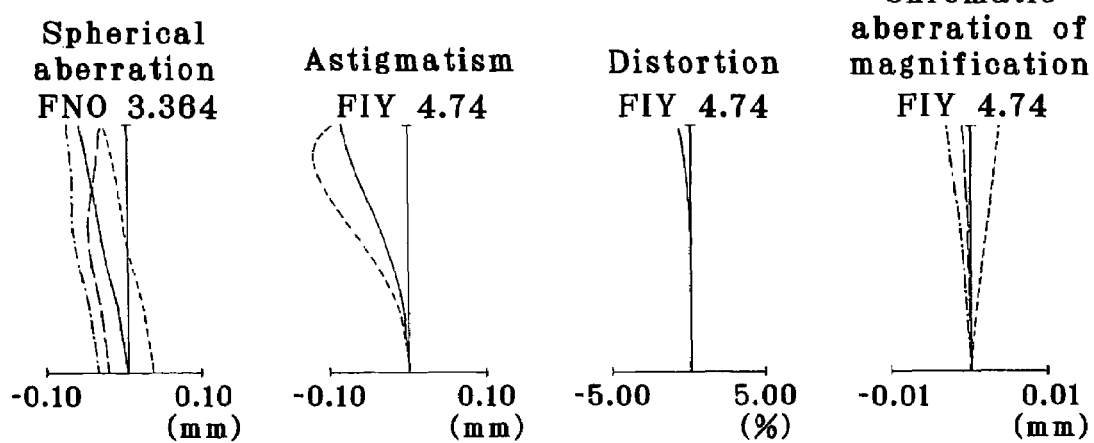
Figure 7C:
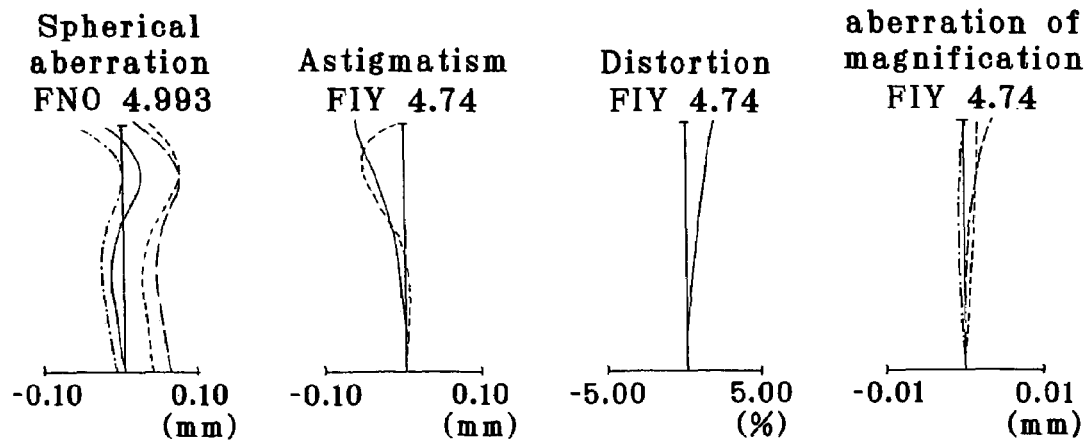

The zoom lens of the invention is now explained with reference to Examples 1 to 5. FIGS. 1 and 2 are illustrative in lens arrangement section of Examples 1 and 2 (a) at the wide-angle end, (b) in an intermediate setting and (c) at the telephoto end, respectively, upon focusing on an infinite object point. Examples 3, 4 and 5 are not shown because of being similar in construction to Example 2. In FIGS. 1 and 2, G1 is indicative of the first lens unit, S an aperture stop, G2 the second lens unit, G3 the third lens unit, F a plane-parallel plate that forms a low-pass filter with a wavelength range limiting coating applied thereon to limit ultraviolet light, C a plane-parallel plate cover glass for an electronic imaging device, and I the image plane. Note that the cover glass C could be applied on its surface with a wavelength range limiting multilayer film or, alternatively, it could have a low-pass filter function.

EXAMPLE 1

As depicted in FIG. 1, this example is directed to a zoom lens made up of, in order from its object side, a first lens unit G1 of negative refracting power, an aperture stop S, and a second lens unit G2 of positive refracting power. Upon zooming from the wide-angle end to the telephoto end, the first lens unit G1 moves in a convex locus toward the image plane side and is positioned nearer to the image side at the telephoto end than at the wide-angle end and in the intermediate setting, and the aperture stop S and the second lens unit G2 move together monotonously toward the object side.

In order from the object side, the first lens unit G1 is composed of a negative meniscus lens convex on its object side and a positive meniscus lens convex on its object side, and the second lens unit G2 is composed of a cemented triplet consisting of a positive meniscus lens convex on its object side, a negative meniscus lens convex on its object side and a positive meniscus lens convex on its object side.

Three aspheric surfaces are used: one at the image-side surface of the negative meniscus lens in the first lens unit G1, and two at the surfaces nearest to the object and image sides of the cemented triplet in the second lens unit G2.

EXAMPLES 2-5

As depicted in FIG. 2, these examples are each directed to a zoom lens made up of, in order from its object side, a first lens unit G1 of negative refracting power, an aperture stop S, a second lens unit G2 of positive refracting power and a third lens unit G3 of positive refracting power. Upon zooming from the wide-angle end to the telephoto end, the first lens unit G1 moves in a convex locus toward the image plane side and is positioned nearer to the object side at the telephoto end than in the intermediate setting and somewhat nearer to the image side at the telephoto end than at the wide-angle end, the aperture stop S and the second lens unit G2 move together monotonously toward the object side, and the third lens unit G3 moves in a convex locus toward the object side and is positioned somewhat nearer to the image side at the telephoto end than at the wide-angle end.

In order from the object side, the first lens unit G1 is composed of a negative meniscus lens convex on its object side and a positive meniscus lens convex on its object side, the second lens unit G2 is composed of a double-convex positive lens and a cemented doublet consisting of a double-convex positive lens and a double-concave negative lens, and the third lens unit G3 is composed of one double-convex positive lens.

Four aspheric surfaces are used: one at the image-side surface of the negative meniscus lens, two at both surfaces of the double-convex positive lens that is a single lens in the second lens unit G2, and one at the image-side surface of the double-convex positive lens that is a single lens in the third lens unit G3.

Throughout Examples 2 to 5, focusing is implemented by movement of the third lens unit G3 in the optical axis direction.

Throughout Examples 1 to 5, note that focusing could be carried out by movement of the first lens unit G1 alone, the second lens unit G2 alone, or the whole system of the zoom lens.

Set out below are the numerical data on each example. The symbols used hereinafter but not hereinbefore are indicative of:

f: focal length of the whole system,
$F_{NO}$: F-number,
$2\omega$: angle of view,
WE: wide-angle end,
ST: intermediate setting,
TE: telephoto end,
$r_1, r_2$, etc.: radius of curvature of each lens surface,
$d_1, d_2$, etc.: space between adjacent lens surfaces,
$n_{d1}, n_{d2}$, etc.: d-line index of each lens, and
$\nu_{d1}, \nu_{d2}$, etc.: Abbe constant of each lens.

Note that aspheric configuration is given by the following formula that x is indicative of an optical axis with the direction of travel of light taken as positive and y is indicative of a direction orthogonal to the optical axis.

$$x=(y^2/r)/[1+\{1-(K+1)(y/r)^2\}^{1/2}]+A4y4+A6y6+A8y8+A10y10+A12y12$$

Here r is a paraxial radius of curvature, K is a conical coefficient, and $A_4, A_6, A_8, A_{10}$ and $A_{12}$ are the $4^{th}$-, $6^{th}$-, $8^{th}$-, $10^{th}$- and $12^{th}$-order aspheric coefficients, respectively.

EXAMPLE 1

| | | | |
|---|---|---|---|
| $r_1$ = 108.042 | $d_1$ = 1.20 | $n_{d1}$ = 1.76802 | $\nu_{d1}$ = 49.24 |
| $r_2$ = 6.708 (Aspheric) | $d_2$ = 2.10 | | |
| $r_3$ = 10.793 | $d_3$ = 2.02 | $n_{d2}$ = 1.90366 | $\nu_{d2}$ = 31.31 |
| $r_4$ = 23.068 | $d_4$ = (Variable) | | |
| $r_5$ = ∞ (Stop) | $d_5$ = −0.85 | | |
| $r_6$ = 6.848 (Aspheric) | $d_6$ = 2.71 | $n_{d3}$ = 1.77377 | $\nu_{d3}$ = 47.18 |
| $r_7$ = 108.781 | $d_7$ = 0.80 | $n_{d4}$ = 1.80518 | $\nu_{d4}$ = 25.43 |
| $r_8$ = 7.546 | $d_8$ = 4.11 | $n_{d5}$ = 1.58313 | $\nu_{d5}$ = 59.46 |
| $r_9$ = 29.503 (Aspheric) | $d_9$ = (Variable) | | |
| $r_{10}$ = ∞ | $d_{10}$ = 0.95 | $n_{d6}$ = 1.54771 | $\nu_{d6}$ = 62.84 |
| $r_{11}$ = ∞ | $d_{11}$ = 0.55 | | |
| $r_{12}$ = ∞ | $d_{12}$ = 0.50 | $n_{d7}$ = 1.51633 | $\nu_{d7}$ = 64.14 |
| $r_{13}$ = ∞ | $d_{13}$ = 1.02 | | |
| $r_{14}$ = ∞ (Image plane) | | | |

Aspherical Coefficients

2nd surface

K = −0.294
$A_4$ = −7.55134 × $10^{-5}$
$A_6$ = −5.49709 × $10^{-7}$
$A_8$ = −4.99503 × $10^{-8}$
$A_{10}$ = 1.19213 × $10^{-12}$

6th surface

K = −0.845
$A_4$ = 3.13655 × $10^{-4}$
$A_6$ = 6.27405 × $10^{-8}$
$A_8$ = 3.18418 × $10^{-7}$
$A_{10}$ = −5.48797 × $10^{-9}$

9th surface

K = −0.299
$A_4$ = 1.52846 × $10^{-3}$
$A_6$ = −6.38153 × $10^{-6}$
$A_8$ = 8.63601 × $10^{-6}$
$A_{10}$ = −5.05358 × $10^{-7}$
$A_{12}$ = 2.28142 × $10^{-8}$

Zooming Data (∞)

| | WE | ST | TE |
|---|---|---|---|
| f (mm) | 8.203 | 13.499 | 23.275 |
| $F_{NO}$ | 3.17 | 3.89 | 5.21 |
| $2\omega$ (°) | 60.5 | 37.1 | 21.8 |
| $d_4$ | 21.11 | 9.71 | 2.30 |
| $d_9$ | 9.73 | 13.23 | 19.70 |

EXAMPLE 2

| | | | |
|---|---|---|---|
| $r_1$ = 486.879 | $d_1$ = 1.20 | $n_{d1}$ = 1.74330 | $\nu_{d1}$ = 49.33 |
| $r_2$ = 6.572 (Aspheric) | $d_2$ = 1.84 | | |
| $r_3$ = 11.096 | $d_3$ = 2.64 | $n_{d2}$ = 1.90366 | $\nu_{d2}$ = 31.31 |
| $r_4$ = 29.983 | $d_4$ = (Variable) | | |
| $r_5$ = ∞ (Stop) | $d_5$ = 0.20 | | |
| $r_6$ = 9.565 (Aspheric) | $d_6$ = 2.40 | $n_{d3}$ = 1.58313 | $\nu_{d3}$ = 59.46 |
| $r_7$ = −32.947 (Aspheric) | $d_7$ = 0.10 | | |
| $r_8$ = 10.752 | $d_8$ = 2.31 | $n_{d4}$ = 1.77250 | $\nu_{d4}$ = 49.60 |
| $r_9$ = −10.752 | $d_9$ = 0.70 | $n_{d5}$ = 1.64769 | $\nu_{d5}$ = 33.79 |
| $r_{10}$ = 5.145 | $d_{10}$ = (Variable) | | |
| $r_{11}$ = 15.888 | $d_{11}$ = 1.74 | $n_{d6}$ = 1.58313 | $\nu_{d6}$ = 59.46 |
| $r_{12}$ = −92.317 (Aspheric) | $d_{12}$ = (Variable) | | |
| $r_{13}$ = ∞ | $d_{13}$ = 0.86 | $n_{d7}$ = 1.54771 | $\nu_{d7}$ = 62.84 |
| $r_{14}$ = ∞ | $d_{14}$ = 0.50 | | |
| $r_{15}$ = ∞ | $d_{15}$ = 0.50 | $n_{d8}$ = 1.51633 | $\nu_{d8}$ = 64.14 |
| $r_{16}$ = ∞ | $d_{16}$ = 0.43 | | |
| $r_{17}$ = ∞ (Image plane) | | | |

Aspherical Coefficients

2nd surface

K = −0.639
$A_4$ = −2.98759 × $10^{-5}$
$A_6$ = 3.27427 × $10^{-6}$
$A_8$ = −1.20087 × $10^{-7}$
$A_{10}$ = 1.35884 × $10^{-9}$

6th surface

K = 0.000
$A_4$ = −2.50030 × $10^{-4}$
$A_6$ = −5.47642 × $10^{-6}$
$A_8$ = −2.75670 × $10^{-7}$
$A_{10}$ = 7.44525 × $10^{-10}$

7th surface

K = 0.000
$A_4$ = 1.00025 × $10^{-5}$
$A_6$ = −4.46990 × $10^{-6}$
$A_8$ = −2.98489 × $10^{-7}$
$A_{10}$ = 5.19077 × $10^{-9}$

12th surface

K = 0.000
$A_4$ = 9.29735 × $10^{-5}$
$A_6$ = −3.43799 × $10^{-6}$
$A_8$ = 5.61229 × $10^{-8}$
$A_{10}$ = 0

Zooming Data (∞)

| | WE | ST | TE |
|---|---|---|---|
| f (mm) | 8.160 | 12.898 | 23.519 |
| $F_{NO}$ | 2.78 | 3.37 | 5.00 |
| $2\omega$ (°) | 60.6 | 39.1 | 21.5 |
| $d_4$ | 18.95 | 8.79 | 2.56 |
| $d_{10}$ | 8.51 | 12.48 | 24.73 |
| $d_{12}$ | 3.93 | 4.69 | 3.27 |

EXAMPLE 3

| | | | |
|---|---|---|---|
| $r_1 = 486.879$ | $d_1 = 1.20$ | $n_{d1} = 1.76802$ | $\nu_{d1} = 49.24$ |
| $r_2 = 6.645$ (Aspheric) | $d_2 = 1.84$ | | |
| $r_3 = 11.096$ | $d_3 = 2.64$ | $n_{d2} = 1.90366$ | $\nu_{d2} = 31.31$ |
| $r_4 = 29.983$ | $d_4 =$ (Variable) | | |
| $r_5 = \infty$ (Stop) | $d_5 = 0.20$ | | |
| $r_6 = 9.545$ (Aspheric) | $d_6 = 2.40$ | $n_{d3} = 1.58313$ | $\nu_{d3} = 59.46$ |
| $r_7 = -27.157$ (Aspheric) | $d_7 = 0.10$ | | |
| $r_8 = 11.231$ | $d_8 = 2.31$ | $n_{d4} = 1.77250$ | $\nu_{d4} = 49.60$ |
| $r_9 = -10.413$ | $d_9 = 0.70$ | $n_{d5} = 1.64769$ | $\nu_{d5} = 33.79$ |
| $r_{10} = 5.145$ | $d_{10} =$ (Variable) | | |
| $r_{11} = 18.541$ | $d_{11} = 1.74$ | $n_{d6} = 1.58313$ | $\nu_{d6} = 59.46$ |
| $r_{12} = -48.356$ (Aspheric) | $d_{12} =$ (Variable) | | |
| $r_{13} = \infty$ | $d_{13} = 0.86$ | $n_{d7} = 1.54771$ | $\nu_{d7} = 62.84$ |
| $r_{14} = \infty$ | $d_{14} = 0.50$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.43$ | | |
| $r_{17} = \infty$ (Image plane) | | | |

Aspherical Coefficients

2nd surface $K = -0.640$
$A_4 = -1.93128 \times 10^{-5}$
$A_6 = 3.09412 \times 10^{-6}$
$A_8 = -1.14942 \times 10^{-7}$
$A_{10} = 1.33472 \times 10^{-9}$ 6th surface $K = 0.000$
$A_4 = -3.03396 \times 10^{-4}$
$A_6 = -8.09623 \times 10^{-6}$
$A_8 = -2.93773 \times 10^{-7}$
$A_{10} = -5.59229 \times 10^{-9}$ 7th surface $K = 0.000$
$A_4 = -2.34522 \times 10^{-5}$
$A_6 = -7.40484 \times 10^{-6}$
$A_8 = -3.02179 \times 10^{-7}$
$A_{10} = -2.62318 \times 10^{-10}$ 12th surface $K = 0.000$
$A_4 = 9.38135 \times 10^{-5}$
$A_6 = -2.59439 \times 10^{-6}$
$A_8 = 4.06888 \times 10^{-8}$
$A_{10} = 0$ Zooming Data ($\infty$)

| | WE | ST | TE |
|---|---|---|---|
| f (mm) | 8.160 | 12.898 | 23.517 |
| $F_{NO}$ | 2.80 | 3.40 | 4.99 |
| 2ω (°) | 60.6 | 38.9 | 21.5 |
| $d_4$ | 18.86 | 9.05 | 2.59 |
| $d_{10}$ | 9.32 | 13.42 | 25.08 |
| $d_{12}$ | 3.39 | 4.08 | 3.32 |

EXAMPLE 4

| | | | |
|---|---|---|---|
| $r_1 = 318.320$ | $d_1 = 1.20$ | $n_{d1} = 1.76802$ | $\nu_{d1} = 49.24$ |
| $r_2 = 6.577$ (Aspheric) | $d_2 = 1.82$ | | |
| $r_3 = 11.349$ | $d_3 = 2.42$ | $n_{d2} = 2.08200$ | $\nu_{d2} = 30.40$ |
| $r_4 = 25.614$ | $d_4 =$ (Variable) | | |
| $r_5 = \infty$ (Stop) | $d_5 = 0.20$ | | |
| $r_6 = 9.567$ (Aspheric) | $d_6 = 2.40$ | $n_{d3} = 1.58313$ | $\nu_{d3} = 59.46$ |
| $r_7 = -24.132$ (Aspheric) | $d_7 = 0.10$ | | |
| $r_8 = 12.907$ | $d_8 = 2.31$ | $n_{d4} = 1.77250$ | $\nu_{d4} = 49.60$ |
| $r_9 = -8.977$ | $d_9 = 0.70$ | $n_{d5} = 1.64769$ | $\nu_{d5} = 33.79$ |
| $r_{10} = 5.412$ | $d_{10} =$ (Variable) | | |
| $r_{11} = 15.888$ | $d_{11} = 1.74$ | $n_{d6} = 1.58313$ | $\nu_{d6} = 59.46$ |
| $r_{12} = -94.482$ (Aspheric) | $d_{12} =$ (Variable) | | |
| $r_{13} = \infty$ | $d_{13} = 0.86$ | $n_{d7} = 1.54771$ | $\nu_{d7} = 62.84$ |
| $r_{14} = \infty$ | $d_{14} = 0.50$ | | |
| $r_{15} = \infty$ | $d_{15} = 0.50$ | $n_{d8} = 1.51633$ | $\nu_{d8} = 64.14$ |
| $r_{16} = \infty$ | $d_{16} = 0.43$ | | |
| $r_{17} = \infty$ (Image plane) | | | |

Aspherical Coefficients

2nd surface $K = -0.629$
$A_4 = -3.38899 \times 10^{-5}$
$A_6 = 3.12452 \times 10^{-6}$
$A_8 = -1.21401 \times 10^{-7}$
$A_{10} = 1.36173 \times 10^{-9}$ 6th surface $K = 0.000$
$A_4 = -3.78307 \times 10^{-4}$
$A_6 = -8.54823 \times 10^{-6}$
$A_8 = -3.26150 \times 10^{-7}$
$A_{10} = -1.05875 \times 10^{-8}$ 7th surface $K = 0.000$
$A_4 = -5.94059 \times 10^{-5}$
$A_6 = -8.00131 \times 10^{-6}$
$A_8 = -2.99719 \times 10^{-7}$
$A_{10} = -4.82349 \times 10^{-9}$ 12th surface $K = 0.000$
$A_4 = 8.69257 \times 10^{-5}$
$A_6 = -2.84130 \times 10^{-6}$
$A_8 = 4.77586 \times 10^{-8}$
$A_{10} = 0$ Zooming Data ($\infty$)

| | WE | ST | TE |
|---|---|---|---|
| f (mm) | 8.160 | 12.899 | 23.519 |
| $F_{NO}$ | 2.80 | 3.39 | 5.04 |
| 2ω (°) | 60.6 | 39.1 | 21.5 |
| $d_4$ | 18.94 | 8.85 | 2.66 |
| $d_{10}$ | 8.40 | 12.43 | 24.75 |
| $d_{12}$ | 4.07 | 4.79 | 3.32 |

EXAMPLE 5

| | | | |
|---|---|---|---|
| $r_1 = 294.078$ | $d_1 = 1.20$ | $n_{d1} = 1.74330$ | $\nu_{d1} = 49.33$ |
| $r_2 = 6.502$ (Aspheric) | $d_2 = 1.80$ | | |
| $r_3 = 10.826$ | $d_3 = 2.57$ | $n_{d2} = 1.90366$ | $\nu_{d2} = 31.31$ |
| $r_4 = 27.909$ | $d_4 =$ (Variable) | | |
| $r_5 = \infty$ (Stop) | $d_5 = 0.19$ | | |
| $r_6 = 9.136$ (Aspheric) | $d_6 = 2.18$ | $n_{d3} = 1.58313$ | $\nu_{d3} = 59.46$ |
| $r_7 = -39.275$ (Aspheric) | $d_7 = 0.10$ | | |
| $r_8 = 10.822$ | $d_8 = 2.50$ | $n_{d4} = 1.77250$ | $\nu_{d4} = 49.60$ |
| $r_9 = -9.099$ | $d_9 = 0.70$ | $n_{d5} = 1.64769$ | $\nu_{d5} = 33.79$ |
| $r_{10} = 5.101$ | $d_{10} =$ (Variable) | | |
| $r_{11} = 15.878$ | $d_{11} = 1.67$ | $n_{d6} = 1.58313$ | $\nu_{d6} = 59.46$ |
| $r_{12} = -85.491$ (Aspheric) | $d_{12} =$ (Variable) | | |
| $r_{13} = \infty$ | $d_{13} = 0.86$ | $n_{d7} = 1.54771$ | $\nu_{d7} = 62.84$ |

-continued

| | | | |
|---|---|---|---|
| $r_{14} = \infty$ | $d_{14} = 0.50$ | | |
| $r_{15} = \infty$ | $d_{15} = 0.50$ | $n_{d8} = 1.51633$ | $v_{d8} = 64.14$ |
| $r_{16} = \infty$ | $d_{16} = 0.42$ | | |
| $r_{17} = \infty$ (Image plane) | | | |

Aspherical Coefficients

2nd surface $K = -0.596$
$A_4 = -2.94826 \times 10^{-5}$
$A_6 = 2.52126 \times 10^{-6}$
$A_8 = -9.55661 \times 10^{-8}$
$A_{10} = 1.01269 \times 10^{-9}$ 6th surface $K = -5.804$
$A_4 = 7.57126 \times 10^{-4}$
$A_6 = -2.09226 \times 10^{-5}$
$A_8 = 6.30687 \times 10^{-7}$
$A_{10} = -1.52351 \times 10^{-9}$ 7th surface $K = 0.000$
$A_4 = 1.12664 \times 10^{-4}$
$A_6 = 5.88091 \times 10^{-6}$
$A_8 = -2.73515 \times 10^{-7}$
$A_{10} = 2.10480 \times 10^{-8}$ 12th surface $K = 0.000$
$A_4 = 8.66591 \times 10^{-5}$
$A_6 = -2.64058 \times 10^{-6}$
$A_8 = 4.05681 \times 10^{-8}$
$A_{10} = 0$ Zooming Data ($\infty$)

| | WE | ST | TE |
|---|---|---|---|
| f (mm) | 8.160 | 12.848 | 23.520 |
| $F_{NO}$ | 2.79 | 3.36 | 4.99 |
| 2ω (°) | 60.6 | 39.2 | 21.5 |
| $d_4$ | 18.23 | 8.47 | 2.18 |
| $d_{10}$ | 8.33 | 12.15 | 23.83 |
| $d_{12}$ | 3.64 | 4.36 | 3.26 |

FIGS. 3, 4, 5, 6 and 7 are aberration diagrams for Examples 1, 2, 3, 4 and 5 upon focusing on an infinite object point. In these aberration diagrams, (a), (b) and (c) are indicative of spherical aberration, astigmatism, distortion and chromatic aberration of magnification at the wide-angle end, in the intermediate setting, and at the telephoto end, respectively, and "FIY" is indicative of the maximum image height.

Tabulate below are the values of conditions (1) to (15) in each of the examples given above.

| Conditions | Example 1 | Example 2 | Example 3 | Example 4 | Example 5 |
|---|---|---|---|---|---|
| (1) | 1.76802 | 1.74330 | 1.76802 | 1.76802 | 1.74330 |
| (2) | 1.90366 | 1.90366 | 1.90366 | 2.08200 | 1.90366 |
| (3) | 31.310 | 31.310 | 31.310 | 30.400 | 31.310 |
| (4) | 0.136 | 0.160 | 0.136 | 0.314 | 0.160 |
| (5) | 17.930 | 18.020 | 17.930 | 18.840 | 18.020 |
| (6) | 0.229 | 0.242 | 0.242 | 0.231 | 0.237 |
| (7) | 0.450 | −0.491 | −0.479 | −0.506 | −0.491 |
| (8) | −0.363 | −0.460 | −0.460 | −0.386 | −0.441 |
| (9) | — | −0.355 | −0.350 | −0.410 | −0.336 |
| (10) | — | 3.404 | 3.514 | 3.279 | 4.231 |
| (11) | — | −1.818 | −2.084 | −2.314 | −1.606 |
| (12) | — | 0.00344 | 0.00447 | 0.00376 | 0.00377 |
| (13) | — | −1.416 | −2.244 | −1.404 | −1.456 |
| (14) | — | 0.550 | 0.550 | 0.540 | 0.540 |
| (15) | — | −1.353 | −1.312 | −1.356 | −1.383 |

Figure 8:
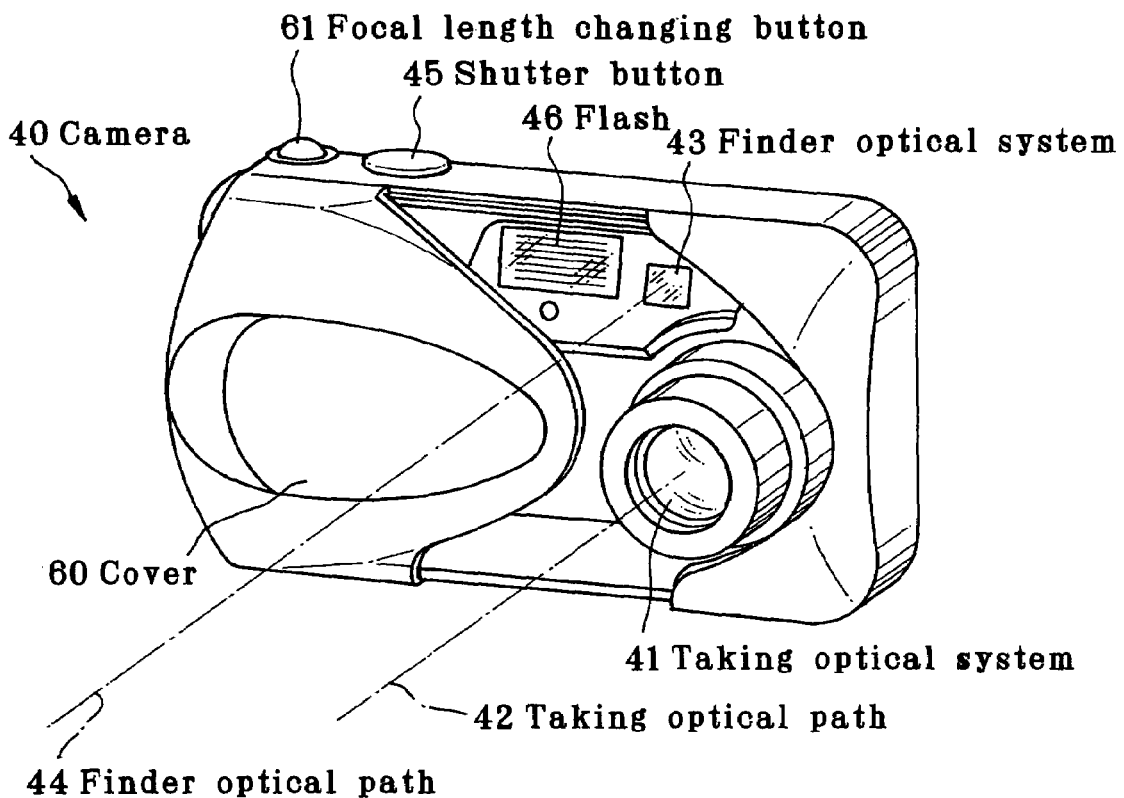
FIG. 8 is a front perspective view of the outside configuration of one exemplary digital camera according to the invention.
Figure 9:
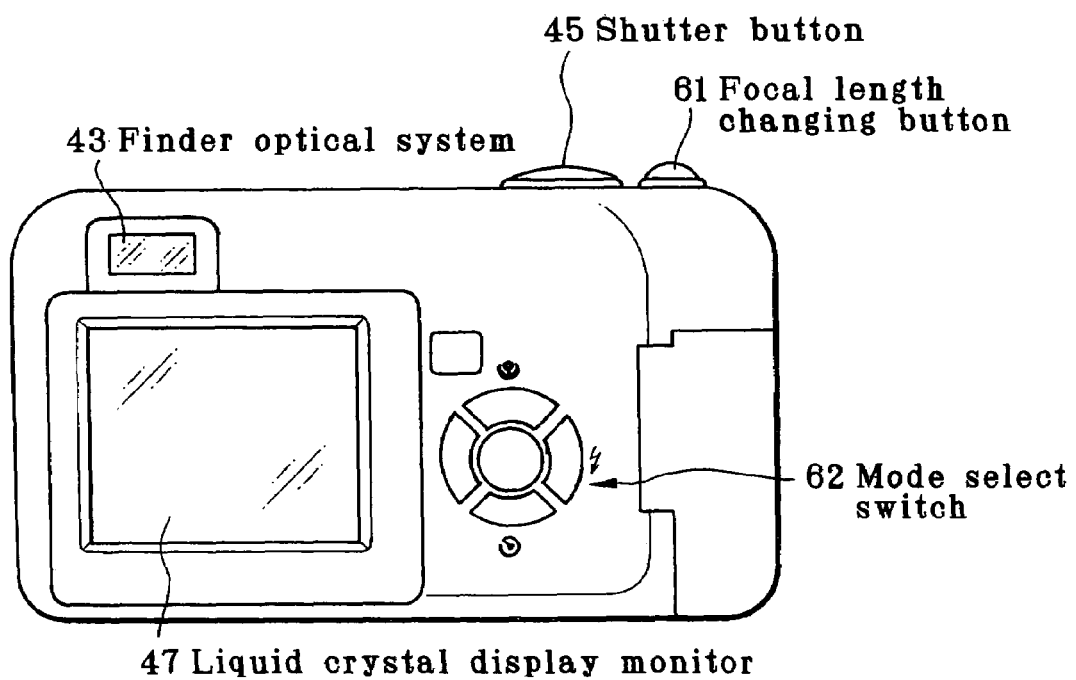
FIG. 9 is a rear perspective view of the digital camera of FIG. 8.
Figure 10:
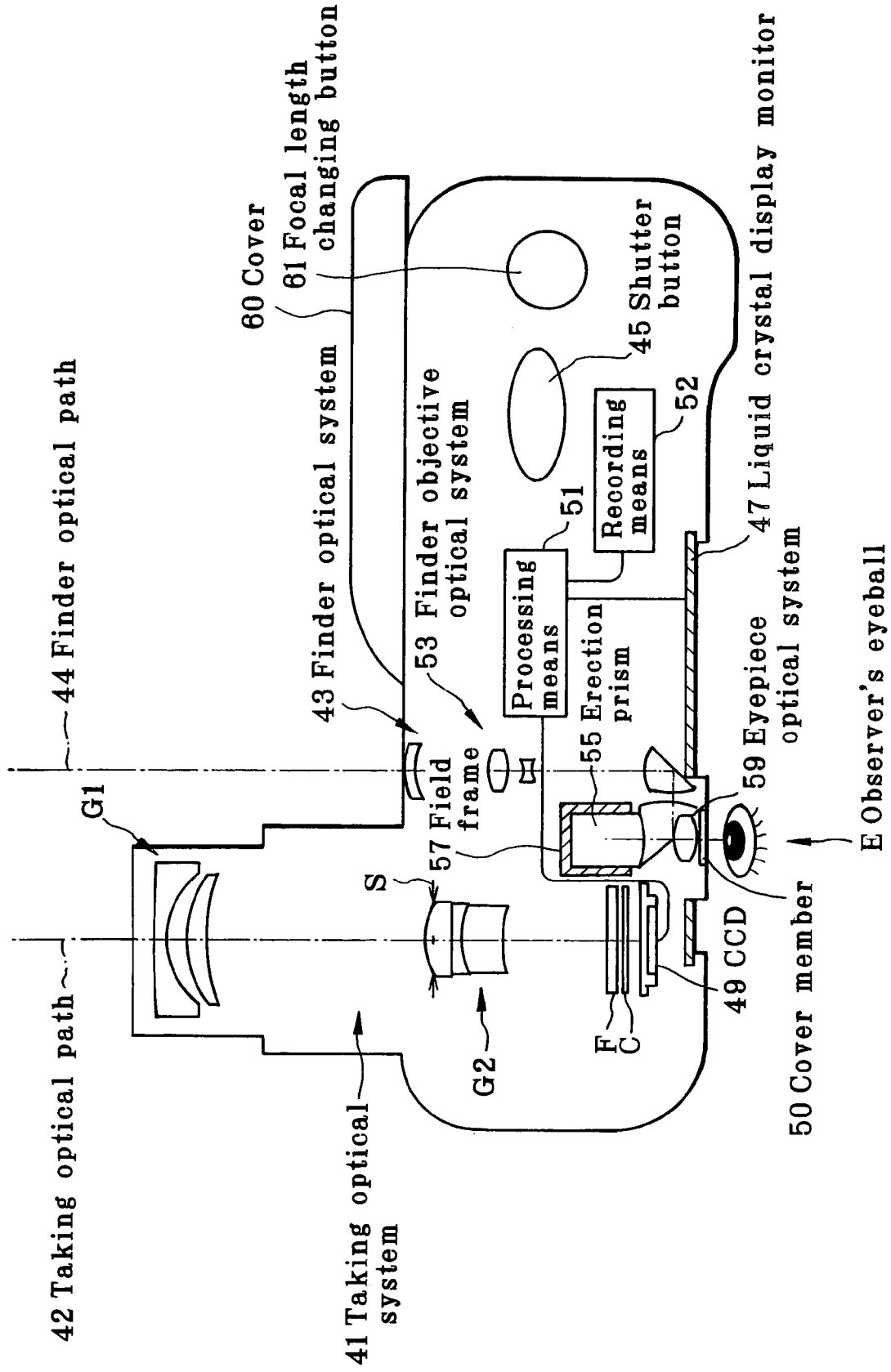
FIG. 10 is a sectional view of the digital camera of FIG. 8.

FIGS. 8, 9 and 10 are illustrative in conception of the construction of a digital camera according to the invention, in which the inventive zoom lens is built in its taking optical system 41. Specifically, FIG. 8 is a front perspective view of the appearance of a digital camera 40, FIG. 9 is a rear front view of the digital camera 40, and FIG. 10 is a schematic sectional view of the construction of the digital camera 40. Note here that FIGS. 8 and 10 illustrate that the taking optical system 41 is in a taking mode. In this embodiment, the digital camera 40 comprises a taking optical system 41 having a taking optical path 42, a finder optical system 43 having a finder optical path 44, a shutter button 45, a flash 46, a liquid crystal display monitor 47, a focal length change button 61, a mode select switch 62 and so on. When the taking optical system 41 is received at a collapsible lens mount, a cover 60 is slid over the taking optical system 41, the finder optical system 43 and the flash 46. As the cover 60 is slid open to place the camera 40 in a taking mode, the taking optical system 41 is flipped out of the camera body, as shown in FIG. 10. Then, as the shutter button 45 mounted on the upper side of the camera 40 is pressed down, it causes taking to be implemented through the taking optical system 41, for instance, the zoom lens of Example 1. An object image formed through the taking optical system 41 is formed on the image pickup plane of CCD 49 via a low-pass filter F with a wavelength range limiting coating applied on it and a cover glass CG. The object image received at CCD 49 is displayed as an electronic image on the liquid crystal display monitor 47 mounted on the back surface of the camera via processing means 51. Note here that the processing means 51 could be connected with recording means 52 for recording the taken electronic image in it. Also note that the recording means 52 could be provided separately from the processing means 51 or, alternatively, it could be designed such that images are electronically recorded and written on a floppy disk, a memory card, an MO or the like. Further, a silver-halide film could be used in place of CCD 49 to set up a silver-halide camera.

Further, a finder objective optical system 53 is located on the finder optical path 44. The finder objective optical system 53 comprises a zoom optical system that is made up of a plurality of lens units (three units in the embodiment of FIGS. 8-10) and two prisms with its focal length variable in operable association with the zoom lens that is the taking optical system 41. An object image formed through the finder objective optical system 53 is formed on a field frame 57 of an erection prism 55 that is an image-erecting member. In the rear of the erection prism 55, there is located an eyepiece optical system 59 for guiding an erected image into the eyeball E of the viewer. Note here that a cover member 50 is located on the exit side of the eyepiece optical system 59.

The thus assembled digital camera 40 can be much more improved in performance, size and wide-angle arrangement, because the taking optical system 41 is much more slimmed down upon received at a collapsible lens mount and can have an ever higher zoom ratio and extremely stabilized image-formation capability all over the zoom range according to the invention.

It is noted that FIG. 11 is illustrative, as in FIG. 10, of the digital camera using the zoom lens of Example 2.

What I claim is:

1. A zoom lens comprising, in order from an object side to an image side thereof, a first lens unit of negative refracting power, and a second lens unit of positive refracting power, with a space between both the lens units varied for zooming, wherein:

the first lens unit consists of, in order from an object side thereof, one negative lens $L_{11}$ and one positive lens $L_{12}$, and satisfies the following conditions:

$$1.6800 < n_{d1} < 2.3000 \quad (1)$$

$$1.7000 < n_{d2} < 2.3000 \quad (2)$$

$$30.0 < v_{d2} < 50.0 \quad (3)$$

$$0.0 < n_{d2} - n_{d1} < 0.5 \quad (4)$$

where $v_{d2}$ is an Abbe constant of the positive lens in the first lens unit, $n_{d1}$ is a refractive index of the negative lens in the first lens unit, and $n_{d2}$ is a refracting index of the positive lens in the first lens unit.

2. The zoom lens according to claim 1, which satisfies the following condition:

$$16.0 < v_{d1} - v_{d2} < 50.0 \quad (5)$$

where $v_{d1}$ is an Abbe constant of the negative lens in the first lens unit.

3. The zoom lens according to claim 1, which satisfies the following condition:

$$0.10 < \Sigma d_1 / f_t < 0.50 \quad (6)$$

where $\Sigma d1$ is an axial thickness of the first lens unit from a surface nearest to an object side thereof to a surface nearest to an image side thereof, and $f_t$ is a focal length of a whole zoom lens system at the telephoto end.

4. The zoom lens according to claim 1, which satisfies the following condition:

$$0.25 < |f_{11}/f_{12}| < 0.60 \quad (7)$$

where $f_{11}$ is a focal length of the negative lens in the first lens unit, and $f_{12}$ is a focal length of the positive lens in the first lens unit.

5. The zoom lens according to claim 1, wherein the positive lens satisfies the following condition:

$$-0.6 < SF_{12} < -0.1 \quad (8)$$

where $SF_{12}$ is defined as being equal to $(R_{11} - R_{12})/(R_{11} + R_{12})$ where:

$R_{11}$ is a paraxial radius of curvature of an object-side surface of the positive lens in the first lens unit, and $R_{12}$ is a paraxial radius of curvature of an image-side surface of the positive lens in the first lens unit.

6. The zoom lens according to claim 1, wherein the second lens unit comprises two positive lenses and one negative lens.

7. The zoom lens according to claim 6, wherein the second lens unit consists of one cemented triplet wherein said two positive lenses and said one negative lens are cemented together on an optical axis.

8. The zoom lens according to claim 6, wherein the second lens unit consists of a positive lens and a cemented lens wherein the cemented lens comprises, in order from an object side thereof, a positive lens and a negative lens.

9. The zoom lens according to claim 1, which is a two units zoom lens.

10. The zoom lens according to claim 1, which comprises, in order from the object side to the image side, the first lens unit of negative refracting power, the second lens unit of positive refracting power, and a third lens unit of positive refracting power.

11. The zoom lens according to claim 1, which is a three units zoom lens.

12. An imaging system, comprising:

the zoom lens according to claim 1, and an imaging device located on an image side thereof and operable to convert an image formed through the zoom lens into electric signals.

13. A zoom lens comprising, in order from an object side to an image side thereof, a first lens unit of negative refracting power, a second lens unit of positive refracting power, and a third lens unit of positive refracting power, with a space between adjacent lens units varied for zooming, wherein:

the first lens unit consists of, in order from an object side thereof, one negative lens and one positive lens, the second lens unit comprises two positive lenses and one negative lens, the third lens unit consists of one positive lens, and the zoom lens satisfies the following condition:

$$(\Sigma d_1 + \Sigma d_2 + \Sigma d_3)/f_t < 0.64 \quad (14)$$

where $\Sigma d_1$ is an axial thickness of the first lens unit from a lens surface nearest to an object side thereof to a lens surface nearest to an image side thereof, $\Sigma d_2$ is an axial thickness of the second lens unit from a lens surface nearest to an object side thereof to a lens surface nearest to an image side thereof, $\Sigma d_3$ is an axial thickness of the third lens unit from a lens surface nearest to an object side thereof to a lens surface nearest to an image side thereof, and $f_t$ is a focal length of a whole zoom lens system at the telephoto end.

14. The zoom lens according to claim 13, which satisfies the following condition:

$$-1.6 < f_1/f_2 < -1.1 \quad (15)$$

where $f_1$ is a focal length of the first lens unit, and $f_2$ is a focal length of the second lens unit.

15. The zoom lens according to claim 13, which satisfies the following condition:

$$0.25 < |f_{11}/f_{12}| < 0.60 \quad (7)$$

where $f_{11}$ is a focal length of the negative lens in the first lens unit, and $f_{12}$ is a focal length of the positive lens in the first lens unit.

16. The zoom lens according to claim 13, which satisfies the following condition:

$$-0.6 < SF_{12} < -0.1 \quad (8)$$

where $SF_{12}$ is defined as being equal to $(R_{11} - R_{12})/(R_{11} + R_{12})$ where:

$R_{11}$ is a paraxial radius of curvature of an object-side surface of the positive lens in the first lens unit, and $R_{12}$ is a paraxial radius of curvature of an image-side surface of the positive lens in the first lens unit.

17. The zoom lens according to claim 13, wherein:

the second lens unit consists of, in order from an object side thereof, a positive lens and a cemented lens, wherein the cemented lens comprises, in order from an object side thereof, a positive lens and a negative lens.

18. The zoom lens according to claim 17, wherein the second lens unit satisfies the following condition:

$$-0.90 < f_{21}/f_{23} < -0.15 \tag{9}$$

where $f_{21}$ is a focal length of the positive lens located in, and nearest to an object side of, the second lens unit, and $f_{23}$ is a focal length of the cemented lens in the second lens unit.

19. The zoom lens according to claim 17, which satisfies the following condition:

$$1.0 < f_{23}/R_{cem} < 6.0 \tag{10}$$

where $f_{23}$ is a focal length of the cemented lens in the second lens unit, and $R_{cem}$ is a paraxial radius of curvature of a cementing surface in the cemented lens in the second lens unit.

20. The zoom lens according to claim 17, wherein the positive lens nearest to an object side of the second lens unit is configured as an aspheric lens that satisfies the following condition:

$$-5.0 < SF_{21} < -1.0 \tag{11}$$

where $SF_{21}$ is defined as being equal to $(R_{21}-R_{22})/(R_{21}+R_{22})$ where $R_{21}$ is a paraxial radius of curvature of an object-side surface of the positive lens nearest to the object side of the second lens unit, and $R_{22}$ is a paraxial radius of curvature of an image-side surface of the positive lens nearest to the object side of the second lens unit.

21. The zoom lens according to claim 13, wherein the third lens unit satisfies the following condition:

$$0.001 < |asp31/f_w| < 0.02 \tag{12}$$

where asp31 is an amount of deviation of an aspheric surface at an effective diameter of the aspheric surface located in the third lens unit, wherein the amount of deviation of the aspheric surface is given by an axial direction distance from the aspheric surface to a spherical surface whose surface vertex is given by that of the aspheric surface and whose radius of curvature is given by a paraxial radius of curvature of the aspheric surface, and $f_w$ is a focal length of a whole system of the zoom lens at the wide-angle end.

22. The zoom lens according to claim 13, wherein the positive lens in the third lens unit satisfies the following condition:

$$-8.0 < SF_{31} < 0.0 \tag{13}$$

where $SF_{31}$ is defined as being equal to $(R_{31}-R_{32})/(R_{31}+R_{32})$ where $R_{31}$ is a paraxial radius of curvature of an object-side surface of the positive lens in the third lens unit, and $R_{32}$ is a paraxial radius of curvature of an image-side surface of the positive lens in the third lens unit.

23. The zoom lens according to claim 13, wherein the zoom lens comprises, in order from the object side to the image side, the first lens unit of negative refracting power, the second lens unit of positive refracting power, and the third lens unit of positive refracting power, and wherein:

the zoom lens is a three units zoom lens.

24. An imaging system, comprising:

the zoom lens according to claim 13, and an imaging device located on an image side thereof and operable to convert an image formed through the zoom lens into electric signals.

* * * * *